United States Patent
Oren et al.

(10) Patent No.: US 10,745,194 B2
(45) Date of Patent: Aug. 18, 2020

(54) CRADLE FOR PROPPANT CONTAINER HAVING TAPERED BOX GUIDES AND ASSOCIATED METHODS

(71) Applicant: Oren Technologies, LLC, Houston, TX (US)

(72) Inventors: John Oren, Houston, TX (US); Joshua Oren, Houston, TX (US)

(73) Assignee: OREN TECHNOLOGIES, LLC, Houston, TX (US)

( * ) Notice: Subject to any disclaimer, the term of this patent is extended or adjusted under 35 U.S.C. 154(b) by 295 days.

(21) Appl. No.: 15/805,649

(22) Filed: Nov. 7, 2017

(65) Prior Publication Data

US 2018/0057252 A1    Mar. 1, 2018

Related U.S. Application Data

(60) Continuation of application No. 15/426,242, filed on Feb. 7, 2017, now Pat. No. 9,840,366, which is a
(Continued)

(51) Int. Cl.
*B65D 90/12* (2006.01)
*B65D 88/30* (2006.01)
*B65G 63/00* (2006.01)

(52) U.S. Cl.
CPC .......... *B65D 90/125* (2013.01); *B65D 88/30* (2013.01); *B65G 63/004* (2013.01)

(58) Field of Classification Search
CPC .. B65D 90/125; B65D 90/0026; B65D 19/06; B65D 19/385; B65D 2519/00955;
(Continued)

(56) References Cited

U.S. PATENT DOCUMENTS

| 137,871 A | 4/1873 | Worsley |
| 150,894 A | 5/1874 | Safely |

(Continued)

FOREIGN PATENT DOCUMENTS

| CA | 2023138 | 2/1992 |
| CA | 2791088 | 3/2013 |

(Continued)

OTHER PUBLICATIONS

Yergin, Daniel, The Quest: Energy, Security, and the Remaking of the Modern World, 2011.
(Continued)

*Primary Examiner* — Glenn F Myers
(74) *Attorney, Agent, or Firm* — Lorenz & Kopf LLP

(57) ABSTRACT

Embodiments of the present disclosure include an apparatus to support a proppant container including a frame to receive and support the proppant container, the frame having a top surface that receives and positions the proppant container above a conveyor to carry proppant disposed thereon away from the proppant container. The apparatus also includes a box guide assembly positioned on the top surface including a corner assembly having two wall segments, and a guide member extending upwardly and positioned adjacent the corner assembly, the guide member including tapered portion of the guide member, the taper having a first width at a top portion of the guide member smaller than a second width at a bottom portion of the guide member. The tapered portion contacts and directs the proppant container to a desired location.

10 Claims, 14 Drawing Sheets

Related U.S. Application Data continuation of application No. 14/986,826, filed on Jan. 4, 2016, now Pat. No. 9,624,030, which is a division of application No. 14/848,447, filed on Sep. 9, 2015, now abandoned, which is a continuation-in-part of application No. 14/676,039, filed on Apr. 1, 2015, now Pat. No. 9,340,353, and a continuation-in-part of application No. 13/628,702, filed on Sep. 27, 2012, now Pat. No. 10,464,741, which is a continuation-in-part of application No. 13/555,635, filed on Jul. 23, 2012, now Pat. No. 9,718,610.

(60) Provisional application No. 62/050,493, filed on Sep. 15, 2014, provisional application No. 62/114,614, filed on Feb. 11, 2015, provisional application No. 62/014,479, filed on Jun. 19, 2014, provisional application No. 62/012,160, filed on Jun. 13, 2014.

(58) Field of Classification Search
CPC .. B65D 2519/0094; B65D 2519/00935; B65D 2519/00243; B65D 2519/00233; B65D 2519/00323; B65D 21/0201; B65D 85/70; B65D 88/30; B65D 88/32; F16M 11/04; B65G 65/30; B65G 63/004; B65G 63/006
See application file for complete search history.

(56) References Cited

U.S. PATENT DOCUMENTS

| | | | |
|---|---|---|---|
| 384,443 | A | 6/1888 | Hoover |
| 448,238 | A | 3/1891 | Johnson |
| 710,611 | A | 10/1902 | Ray |
| 711,632 | A | 10/1902 | Johnson |
| 917,649 | A | 4/1909 | Otto |
| 1,143,641 | A | 6/1915 | McGregor |
| 1,331,883 | A | 2/1920 | Stuart |
| 1,344,768 | A | 6/1920 | Messiter |
| 1,434,488 | A | 11/1922 | Forsythe et al. |
| 1,520,560 | A | 12/1923 | Burno |
| 1,506,936 | A | 9/1924 | Lea |
| 1,526,527 | A | 2/1925 | Butler |
| 1,573,664 | A | 2/1926 | Wetherill |
| 1,807,447 | A | 5/1931 | Smith |
| 1,850,000 | A | 3/1932 | Fernand |
| 1,932,320 | A | 10/1933 | Steward |
| 1,973,312 | A | 9/1934 | Hardinge |
| 2,020,628 | A | 11/1935 | Woodruff |
| 2,233,005 | A | 2/1941 | Garlinghouse |
| 2,255,448 | A | 9/1941 | Morris |
| 2,293,160 | A | 8/1942 | Miller et al. |
| 2,368,672 | A | 2/1945 | McNamara |
| 2,381,103 | A | 8/1945 | Frank |
| 2,385,245 | A | 9/1945 | Willoughby |
| 2,413,661 | A | 12/1946 | Stokes |
| 2,423,879 | A | 7/1947 | De Frees |
| 2,563,470 | A | 8/1951 | Kane |
| 2,564,020 | A | 8/1951 | Mengel |
| 2,603,342 | A | 7/1952 | Martinson |
| 2,616,758 | A | 11/1952 | Meyers |
| 2,622,771 | A | 12/1952 | Tulou |
| 2,652,174 | A | 9/1953 | Shea et al. |
| 2,670,866 | A | 3/1954 | Glesby |
| 2,678,145 | A | 5/1954 | Ejuzwiak et al. |
| 2,693,282 | A | 11/1954 | Sensibar |
| 2,700,574 | A | 1/1955 | Tourneau |
| 2,792,262 | A | 4/1955 | Hathorn |
| 2,774,515 | A | 12/1956 | Johansson et al. |
| 2,791,973 | A | 5/1957 | Dorey |
| 2,801,125 | A | 7/1957 | Page et al. |
| 2,808,164 | A | 10/1957 | Glendinning |
| 2,812,970 | A | 11/1957 | Martinson |
| 2,837,369 | A | 6/1958 | Stopps |
| 2,865,521 | A | 12/1958 | Fisher et al. |
| 2,873,036 | A | 2/1959 | Noble |
| 2,894,666 | A | 7/1959 | Campbell, Jr. |
| 2,988,235 | A | 6/1961 | Ronyak |
| 2,994,460 | A | 8/1961 | Matthews |
| 3,041,113 | A | 6/1962 | Sackett |
| 3,049,248 | A | 8/1962 | Heltzel et al. |
| 3,064,832 | A | 11/1962 | Heltzel |
| 3,083,879 | A | 4/1963 | Coleman |
| 3,090,527 | A | 5/1963 | Rensch |
| 3,109,389 | A | 11/1963 | Karlsson |
| 3,122,258 | A | 2/1964 | Raymond |
| 3,134,606 | A | 5/1964 | Oyler |
| 3,135,432 | A | 6/1964 | McKinney |
| 3,163,127 | A | 12/1964 | Gutridge et al. |
| 3,187,684 | A | 6/1965 | Ortner |
| 3,198,494 | A | 8/1965 | Curran et al. |
| 3,199,585 | A | 8/1965 | Cronberger |
| 3,248,026 | A | 4/1966 | Kemp |
| 3,255,927 | A | 6/1966 | Ruppert et al. |
| 3,265,443 | A | 8/1966 | Simas |
| 3,270,921 | A | 9/1966 | Nadolske et al. |
| 3,281,006 | A | 10/1966 | Tonchung |
| 3,294,306 | A | 12/1966 | Areddy |
| 3,318,473 | A | 5/1967 | Jones et al. |
| 3,326,572 | A | 6/1967 | Murray |
| 3,343,688 | A | 9/1967 | Ross |
| 3,353,599 | A | 11/1967 | Swift |
| 3,354,918 | A | 11/1967 | Coleman |
| 3,378,152 | A | 4/1968 | Warner |
| 3,387,570 | A | 6/1968 | Pulcrano et al. |
| 3,396,675 | A | 8/1968 | Stevens |
| 3,397,654 | A | 8/1968 | Snyder |
| 3,406,995 | A | 10/1968 | McCarthy |
| 3,407,971 | A | 10/1968 | Oehler |
| 3,425,599 | A | 2/1969 | Sammarco et al. |
| 3,455,474 | A | 7/1969 | Truncali |
| 3,476,270 | A | 11/1969 | Cox et al. |
| 3,486,787 | A | 12/1969 | Campbell |
| 3,499,694 | A | 3/1970 | Coppel |
| 3,508,762 | A | 4/1970 | Pratt |
| 3,524,567 | A | 8/1970 | Coleman |
| 3,528,570 | A | 9/1970 | Pase |
| 3,561,633 | A | 2/1971 | Morrison et al. |
| 3,587,834 | A | 6/1971 | Dugge |
| 3,596,609 | A | 8/1971 | Ortner |
| 3,601,244 | A | 8/1971 | Ort et al. |
| 3,602,400 | A | 8/1971 | Cooke |
| 3,650,567 | A | 3/1972 | Danielson |
| 3,653,521 | A | 4/1972 | Bridge |
| 3,661,293 | A | 5/1972 | Gerhard et al. |
| 3,692,363 | A | 9/1972 | Tenebaum et al. |
| 3,704,797 | A | 12/1972 | Suykens |
| 3,721,199 | A | 3/1973 | Hassenauer |
| 3,729,121 | A | 4/1973 | Cannon |
| 3,734,215 | A | 5/1973 | Smith |
| 3,738,511 | A | 6/1973 | Lemon et al. |
| 3,752,511 | A | 8/1973 | Racy |
| 3,777,909 | A | 12/1973 | Rheinfrank |
| 3,785,534 | A | 1/1974 | Smith |
| 3,800,712 | A | 4/1974 | Krug, Jr. |
| 3,802,584 | A | 4/1974 | Sackett |
| 3,817,261 | A | 6/1974 | Rogge |
| 3,820,762 | A | 6/1974 | Bostrom et al. |
| 3,827,578 | A | 8/1974 | Hough |
| 3,840,141 | A | 10/1974 | Allom et al. |
| 3,854,612 | A | 12/1974 | Snape |
| 3,861,716 | A | 1/1975 | Baxter et al. |
| 3,883,005 | A | 5/1975 | Stevens |
| 3,904,105 | A | 9/1975 | Booth |
| 3,909,223 | A | 9/1975 | Schmidt |
| 3,913,933 | A | 10/1975 | Visser et al. |
| 3,933,100 | A | 1/1976 | Dugge |
| 3,963,149 | A | 6/1976 | Fassauer |
| 3,970,123 | A | 7/1976 | Poulton et al. |
| 3,986,708 | A | 10/1976 | Heltzel et al. |
| 3,997,089 | A | 12/1976 | Clarke et al. |
| 3,999,290 | A | 12/1976 | Wood |
| 4,003,301 | A | 1/1977 | Norton |
| 4,004,700 | A | 1/1977 | Empey |
| 4,019,635 | A | 4/1977 | Boots |

(56) References Cited

U.S. PATENT DOCUMENTS

| | | |
|---|---|---|
| 4,057,153 A | 11/1977 | Weaver |
| 4,058,239 A | 11/1977 | Van Mill |
| 4,063,656 A | 12/1977 | Lambert |
| 4,073,410 A | 2/1978 | Melcher |
| 4,125,195 A | 11/1978 | Sasadi |
| 4,138,163 A | 2/1979 | Calvert et al. |
| 4,178,117 A | 12/1979 | Brugler |
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,227,732 A | 10/1980 | Kish |
| 4,232,884 A | 11/1980 | DeWitt |
| 4,239,424 A | 12/1980 | Pavolka |
| 4,245,820 A | 1/1981 | Muryn |
| 4,247,228 A | 1/1981 | Gray et al. |
| 4,247,370 A | 1/1981 | Nijhawan et al. |
| 4,258,953 A | 3/1981 | Johnson |
| 4,265,266 A | 5/1981 | Kierbow et al. |
| 4,278,190 A | 7/1981 | Oory et al. |
| 4,280,640 A | 7/1981 | Daloisio |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,299,597 A | 11/1981 | Oetiker et al. |
| 4,306,895 A | 12/1981 | Thompson et al. |
| 4,329,106 A | 5/1982 | Adler |
| 4,350,241 A | 9/1982 | Wenzel |
| 4,359,176 A | 11/1982 | Johnson |
| 4,363,396 A | 12/1982 | Wolf et al. |
| 4,395,052 A | 7/1983 | Rash |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,420,285 A | 12/1983 | Loyer et al. |
| 4,427,133 A | 1/1984 | Kierbow et al. |
| 4,428,504 A | 1/1984 | Bassett et al. |
| 4,449,861 A | 5/1984 | Saito et al. |
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,513,755 A | 4/1985 | Baroni |
| 4,525,071 A | 6/1985 | Horowitz |
| 4,526,353 A | 7/1985 | Stomp |
| 4,532,098 A | 7/1985 | Campbell |
| 4,534,869 A | 8/1985 | Seibert |
| 4,552,573 A | 11/1985 | Weis |
| 4,569,394 A | 2/1986 | Sweatman et al. |
| 4,570,967 A | 2/1986 | Allnut |
| 4,571,143 A | 2/1986 | Hellerich |
| 4,588,605 A | 5/1986 | Frei et al. |
| 4,608,931 A | 9/1986 | Ruhmann et al. |
| 4,619,531 A | 10/1986 | Dunstan |
| 4,624,729 A | 11/1986 | Bresciani et al. |
| 4,626,155 A | 12/1986 | Hlinsky et al. |
| 4,626,166 A | 12/1986 | Jolly |
| 4,628,825 A | 12/1986 | Taylor et al. |
| 4,639,015 A | 1/1987 | Pitts |
| 4,648,584 A | 3/1987 | Wamser |
| 4,660,733 A | 4/1987 | Snyder et al. |
| 4,701,095 A | 10/1987 | Berryman et al. |
| 4,714,010 A | 12/1987 | Smart |
| 4,715,754 A | 12/1987 | Scully |
| 4,724,976 A | 2/1988 | Lee |
| 4,738,774 A | 4/1988 | Patrick |
| 4,741,273 A | 5/1988 | Sherwood |
| 4,761,039 A | 8/1988 | Hilaris |
| 4,779,751 A | 10/1988 | Munroe |
| 4,798,039 A | 1/1989 | Deglise |
| 4,801,389 A | 1/1989 | Brannon et al. |
| 4,819,830 A | 4/1989 | Schultz |
| 4,836,510 A | 6/1989 | Weber et al. |
| 4,836,735 A | 6/1989 | Dennehy |
| 4,848,605 A | 7/1989 | Wise |
| 4,882,784 A | 11/1989 | Tump |
| 4,889,219 A | 12/1989 | Key |
| 4,901,649 A | 2/1990 | Fehrenbach et al. |
| 4,909,378 A | 3/1990 | Webb |
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,949,714 A | 8/1990 | Orr |
| 4,954,975 A | 9/1990 | Kalata |
| 4,956,821 A | 9/1990 | Fenelon |
| 4,964,243 A | 10/1990 | Reiter |
| 4,975,205 A | 12/1990 | Sloan |
| 4,975,305 A | 12/1990 | Biginelli |
| 4,988,115 A | 1/1991 | Steinke |
| 4,995,522 A | 2/1991 | Barr |
| 5,004,400 A | 4/1991 | Handke |
| 5,028,002 A | 7/1991 | Whitford |
| 5,036,979 A | 8/1991 | Selz |
| 5,042,538 A | 8/1991 | Wiese |
| 5,069,352 A | 12/1991 | Harbolt et al. |
| 5,080,259 A | 1/1992 | Hadley |
| 5,082,304 A | 1/1992 | Preller |
| 5,102,281 A | 4/1992 | Handke |
| 5,102,286 A | 4/1992 | Fenton |
| 5,105,858 A | 4/1992 | Levinson |
| 5,131,524 A | 7/1992 | Uehara |
| 5,167,719 A | 12/1992 | Tamaki |
| 5,190,182 A | 3/1993 | Copas et al. |
| 5,195,861 A | 3/1993 | Handke |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,277,014 A | 1/1994 | White |
| 5,280,883 A | 1/1994 | Ibar |
| 5,286,158 A | 2/1994 | Zimmerman |
| 5,286,294 A | 2/1994 | Ebi et al. |
| 5,290,139 A | 3/1994 | Hedrick |
| 5,317,783 A | 6/1994 | Williamson |
| 5,320,046 A | 6/1994 | Hesch |
| 5,324,097 A | 6/1994 | DeCap |
| 5,339,996 A | 8/1994 | Dubbert |
| 5,345,982 A | 9/1994 | Nadeau et al. |
| 5,358,137 A | 10/1994 | Shuert et al. |
| 5,373,792 A | 12/1994 | Pileggi et al. |
| 5,392,946 A | 2/1995 | Holbrook et al. |
| 5,402,915 A | 4/1995 | Hogan |
| 5,413,154 A | 5/1995 | Hurst, Jr. et al. |
| 5,429,259 A | 7/1995 | Robin |
| 5,441,321 A | 8/1995 | Karpisek |
| 5,465,829 A | 11/1995 | Kruse |
| 5,470,175 A | 11/1995 | Jensen et al. |
| 5,470,176 A | 11/1995 | Corcoran et al. |
| 5,493,852 A | 2/1996 | Stewart |
| 5,498,119 A | 3/1996 | Faivre |
| 5,507,514 A | 4/1996 | Jacques |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |

(56) References Cited

U.S. PATENT DOCUMENTS

| | | |
|---|---|---|
| 5,687,881 A | 11/1997 | Rouse et al. |
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |
| 5,722,552 A | 3/1998 | Olson |
| 5,722,688 A | 3/1998 | Garcia |
| 5,746,258 A | 5/1998 | Huck |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,878,903 A | 3/1999 | Ung |
| 5,906,471 A | 5/1999 | Schwoerer |
| 5,911,337 A | 6/1999 | Bedeker |
| 5,924,829 A | 7/1999 | Hastings |
| 5,927,558 A | 7/1999 | Bruce |
| 5,960,974 A | 10/1999 | Kee |
| 5,971,219 A | 10/1999 | Karpisek |
| 5,993,202 A | 11/1999 | Yamazaki et al. |
| 5,997,099 A | 12/1999 | Collins |
| 6,002,063 A | 12/1999 | Bilak |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| D431,358 S | 10/2000 | Willemsen |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,210,088 B1 | 4/2001 | Crosby |
| 6,231,284 B1 | 5/2001 | Kordel |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Otsman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,390,742 B1 | 5/2002 | Breeden |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,422,413 B1 | 7/2002 | Hall et al. |
| 6,425,725 B1 | 7/2002 | Ehlers |
| 6,450,522 B1 | 9/2002 | Yamada et al. |
| 6,457,291 B2 | 10/2002 | Wick |
| 6,498,976 B1 | 12/2002 | Ehlbeck et al. |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,557,896 B1 | 5/2003 | Stobart |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,066 B2 | 1/2004 | Moshgbar |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Salk |
| 7,252,309 B2 | 8/2007 | Eng Soon et al. |
| 7,284,579 B2 | 10/2007 | Elgan et al. |
| 7,284,670 B2 | 10/2007 | Schmid |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,695,538 B2 | 4/2010 | Cheng |
| 7,753,637 B2 | 7/2010 | Benedict et al. |
| 7,798,558 B2 | 9/2010 | Messier |
| 7,802,958 B2 | 9/2010 | Garcia et al. |
| 7,803,321 B2 | 9/2010 | Lark et al. |
| 7,837,427 B2 | 11/2010 | Becket |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,867,613 B2 | 1/2011 | Smith |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,213 B1 | 8/2011 | Gauthier et al. |
| 7,997,623 B2 | 8/2011 | Williams |
| 8,083,083 B1 | 12/2011 | Mohns |
| 8,201,520 B2 | 6/2012 | Meritt |
| 8,313,278 B2 | 11/2012 | Simmons et al. |
| 8,366,349 B2 | 2/2013 | Beachner |
| 8,375,690 B2 | 2/2013 | LaFargue et al. |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Berning et al. |
| 8,469,065 B2 | 6/2013 | Schroeder et al. |
| D688,351 S | 8/2013 | Oren |
| 8,505,780 B2 | 8/2013 | Oren |
| 8,544,419 B2 | 10/2013 | Spalding et al. |
| 8,545,148 B2 | 10/2013 | Wanek-Pusset et al. |
| 8,562,022 B2 | 10/2013 | Nadeau et al. |
| 8,573,387 B2 | 11/2013 | Trimble |
| 8,573,917 B2 | 11/2013 | Renyer |
| 8,585,341 B1 | 11/2013 | Oren |
| D694,670 S | 12/2013 | Oren |
| 8,616,370 B2 | 12/2013 | Allegretti |

(56) References Cited

U.S. PATENT DOCUMENTS

| | | |
|---|---|---|
| 8,622,251 B2 | 1/2014 | Oren |
| 8,636,832 B2 | 1/2014 | Stutzman et al. |
| 8,646,641 B2 | 2/2014 | Moir |
| 8,662,525 B1 | 3/2014 | Dierks et al. |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,881,749 B1 | 11/2014 | Smith |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,410,414 B2 | 8/2016 | Tudor |
| D780,883 S | 3/2017 | Schaffner et al. |
| D783,771 S | 4/2017 | Stegemoeller et al. |
| D783,772 S | 4/2017 | Stegemoeller, III et al. |
| 9,624,036 B2 | 4/2017 | Luharuka et al. |
| 9,688,492 B2 | 6/2017 | Stutzman et al. |
| 9,796,318 B1 | 10/2017 | Nolasco |
| 2001/0022308 A1 | 9/2001 | Epp et al. |
| 2001/0038777 A1 | 11/2001 | Cassell |
| 2001/0045338 A1 | 11/2001 | Ransil et al. |
| 2002/0134550 A1 | 9/2002 | Leeson et al. |
| 2002/0139643 A1 | 10/2002 | Peltier |
| 2003/0006248 A1 | 1/2003 | Gill et al. |
| 2003/0024971 A1 | 2/2003 | Jones |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2007/0194564 A1 | 8/2007 | Garceau et al. |
| 2008/0008562 A1 | 1/2008 | Beckel et al. |
| 2008/0029546 A1 | 2/2008 | Schuld |
| 2008/0029553 A1 | 2/2008 | Culleton |
| 2008/0058228 A1 | 3/2008 | Wilson |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2008/0315558 A1 | 12/2008 | Cesterino |
| 2009/0038242 A1 | 2/2009 | Cope |
| 2009/0078410 A1 | 3/2009 | Krenek et al. |
| 2009/0223143 A1 | 9/2009 | Esposito |
| 2009/0278326 A1 | 11/2009 | Rowland et al. |
| 2010/0021258 A1 | 1/2010 | Kim |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0072308 A1 | 3/2010 | Hermann et al. |
| 2010/0080681 A1 | 4/2010 | Bain |
| 2010/0108711 A1 | 5/2010 | Wietgrefe |
| 2010/0129193 A1 | 5/2010 | Sherrer |
| 2010/0199668 A1 | 8/2010 | Coustou et al. |
| 2010/0207371 A1 | 8/2010 | Van Houdt et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0121003 A1 | 5/2011 | Moir |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0017812 A1 | 1/2012 | Renyer |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0247335 A1 | 10/2012 | Stutzman et al. |
| 2012/0255539 A1 | 10/2012 | Kolecki |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0034662 A1 | 2/2014 | Chalmers et al. |
| 2014/0044507 A1 | 2/2014 | Naizer et al. |
| 2014/0077484 A1 | 3/2014 | Harrell |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0202590 A1 | 7/2014 | Higgins |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2014/0377042 A1 | 12/2014 | McMahon |
| 2015/0004895 A1 | 1/2015 | Hammers et al. |
| 2015/0069052 A1 | 3/2015 | Allegretti et al. |
| 2015/0079890 A1 | 3/2015 | Stutzman et al. |
| 2015/0086307 A1 | 3/2015 | Stefan |
| 2015/0086308 A1 | 3/2015 | McIver et al. |
| 2015/0107822 A1 | 4/2015 | Tudor |
| 2015/0110565 A1 | 4/2015 | Harris |
| 2015/0115589 A1 | 4/2015 | Thiessen |
| 2015/0159232 A1 | 6/2015 | Zucchi et al. |
| 2015/0209829 A1 | 7/2015 | De Siqueira et al. |
| 2015/0284183 A1 | 10/2015 | Houghton et al. |
| 2016/0148813 A1 | 5/2016 | Rogers et al. |
| 2016/0177678 A1 | 6/2016 | Morris et al. |
| 2016/0185522 A1 | 6/2016 | Herman et al. |
| 2016/0273355 A1 | 9/2016 | Gosney et al. |
| 2016/0280480 A1 | 9/2016 | Smith et al. |
| 2017/0129721 A1 | 5/2017 | Harris et al. |
| 2017/0217353 A1 | 8/2017 | Vander Pol |
| 2018/0009401 A1 | 1/2018 | Miller et al. |

FOREIGN PATENT DOCUMENTS

| | | |
|---|---|---|
| CN | 2037354 | 5/1989 |
| CN | 2059909 | 8/1990 |
| CN | 2075632 | 4/1991 |
| CN | 1329562 | 1/2002 |
| CN | 2517684 | 10/2002 |

(56) References Cited

FOREIGN PATENT DOCUMENTS

| | | |
|---|---|---|
| CN | 1635965 | 7/2005 |
| CN | 2913250 | 6/2007 |
| CN | 201161588 | 12/2008 |
| CN | 201390486 | 1/2010 |
| CN | 101823630 | 9/2010 |
| CN | 102101595 | 6/2011 |
| CN | 201881469 | 6/2011 |
| CN | 102114985 | 7/2011 |
| CN | 203033469 | 7/2013 |
| CN | 203580948 | 5/2014 |
| CN | 103350017 | 10/2016 |
| DE | 3108121 | 9/1982 |
| DE | 3342281 | 6/1985 |
| DE | 4008147 | 9/1990 |
| DE | 4217329 | 5/1993 |
| DE | 20317967 | 3/2004 |
| EP | 0016977 | 10/1980 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1598288 | 11/2005 |
| EP | 1775190 | 4/2007 |
| EP | 1795467 | 6/2007 |
| EP | 2062832 | 5/2009 |
| EP | 2311757 | 4/2011 |
| FR | 2173445 | 10/1973 |
| FR | 2640598 | 6/1990 |
| GB | 1000621 | 8/1965 |
| GB | 1296736 | 11/1972 |
| GB | 1333976 | 10/1973 |
| GB | 2066220 | 7/1981 |
| GB | 2204847 | 11/1988 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| JP | 11034729 | 2/1999 |
| JP | 2007084151 | 4/2007 |
| MX | 2012011046 | 5/2013 |
| NL | 8105283 | 6/1983 |
| WO | 1990008082 | 7/1990 |
| WO | 1992002437 | 2/1992 |
| WO | 1993001997 | 2/1992 |
| WO | 1993006031 | 4/1993 |
| WO | 1996025302 | 8/1996 |
| WO | 2003024815 | 3/2003 |
| WO | 2006039757 | 4/2006 |
| WO | 2007005054 | 1/2007 |
| WO | 2007057398 | 5/2007 |
| WO | 2007061310 | 5/2007 |
| WO | 2008012513 | 1/2008 |
| WO | 2009087338 | 7/2009 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

Gold, Russell, The Boom: How Fracking Ignited the American Energy Revolution and Changed the World, 2014.

Yergin, Daniel, Stepping on the Gas, Wall Street Journal, Apr. 2, 2011.

Raimi, Daniel et al., Dunn County and Watford City, North Dakota: A case study of the fiscal effects of Bakken shale development, Duke University Energy Initiative, May 2016.

Local Economic Impacts Related to Marcellus Shale Development, The Center for Rural Pennyslvania, Sep. 2014.

Eagle Ford Shale Task Force Report, Railroad Commission of Texas, Convened and Chaired by David Porter, Mar. 2013.

Sandbox Logistics LLC et al v. Grit Energy Solutions LLC, 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.

Beard, Tim, Fracture Design in Horizontal Shale Wells—Data Gathering to Implementation, EPA Hydraulic Fracturing Workshop, Mar. 10-11, 2011.

Economic Impact of the Eagle Ford Shale, Center for Community and Business Research at the University of Texas at San Antonio's Institute for Economic Development, Sep. 2014.

Kelsey, Timothy W. et al., Economic Impacts of Marcellus Shale in Pennsylvania: Employment and Income in 2009, The Marcellus Shale Education & Training Center, Aug. 2011.

2006 Montana Commercial Vehicle Size and Weight and Safety Trucker's Handbook, Montana Department of Transportation Motor Carrier Services Division, Fifth Edition, Jun. 2010.

Budzynski, Brian W., Never Meant to Take the Weight, Roads & Bridges, Apr. 2015.

Interstate Weight Limits, 23 C.F.R. § 658, Apr. 1, 2011.

VIN Requirements, 49 C.F.R. § 565, Oct. 1, 2011.

Benson, Mary Ellen et al., Frac Sand in the United States—A Geological and Industry Overview, U.S. Department of the Interior, U.S. Geological Survey, 2015-2017.

Beekman, Thomas J. et al., Transportation Impacts of the Wisconsin Fracture Sand Industry, Wisconsin Department of Transportation, Mar. 2013.

U.S. Silica Company, Material Safety Data Sheet, Jan. 2011.

Texas Transportation Code, Chapter 621, General Provisions Relating to Vehicle Size and Weight (Sec. 621.101 effective Sep. 1, 2005 and Section 621.403 effective Sep. 1, 1995).

Garner, Dwight, Visions of an Age When Oil Isn't King, New York Times, Sep. 20, 2011.

Non-Final Office Action dated Sep. 8, 2017 for co-pending U.S. Appl. No. 15/475,354.

Non-Final Office Action dated Sep. 8, 2017 for co-pending U.S. Appl. No. 15/143,942.

International Search Report and Written Opinion for PCT/US17/34603 dated Aug. 22, 2017.

Non-Final Office Action dated Aug. 30, 2017 for co-pending U.S. Appl. No. 14/943,182.

Non-Final Office Action dated Aug. 4, 2017 for co-pending U.S. Appl. No. 13/625,675.

Randy Lafollette, Key Considerations for Hydraulic Fracturing of Gas Shales, May 12, 2010.

Case No. 4:17-cv-00589, Plaintiffs' P.R. 3-1 and 3-2 Infringement Contentions and Disclosures, Jun. 8, 2017.

Final Office Action dated Oct. 13, 2017 for co-pending U.S. Appl. No. 15/398,950.

Non-Final Office Action dated Sep. 27, 2017 for co-pending U.S. Appl. No. 14/996,362.

Final Office Action dated Sep. 21, 2017 for co-pending U.S. Appl. No. 14/922,836.

Non-Final Office Action dated Oct. 5, 2017 for co-pending U.S. Appl. No. 14/848,447.

Non-Final Office Action dated Sep. 21, 2017 for co-pending U.S. Appl. No. 15/413,822.

Non-Final Office Action dated Sep. 28, 2017 for co-pending U.S. Appl. No. 13/628,702.

Arrows Up, Inc., Jumbo BTS—Bulk Transport System, Aug. 1, 2014.

Arrows Up, Inc., Reusable Packaging Association, Member Spotlight: John Allegretti, President & CEO, Arrows Up, Inc., Jun. 23, 2016.

Seed Today, Arrows Up, Inc. Bulk Transport System (BTS), Country Journal Publishing Co., Decatur, IL, Mar. 2, 2011.

SeedQuest, Arrows Up, Inc. launches innovative bulk transport system for see, Barrington, IL, Mar. 2, 2011.

Monster Tanks, Inc., Sand Monster Website, http://monstertanksinc.com/sandmonster.html, 2012.

Solaris Oilfield Infrastructure, Mobile Sand Silo System, 2016.

(56) References Cited

OTHER PUBLICATIONS

Final Office Action dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
ISO 1496-1: International Standard, Series 1 Freight Containers—Specification and Testing—Part 1, General Cargo Containers, Fifth Edition, Aug. 15, 1990.
ISO 6346: International Standard, Freight Containers—Coding, Identification and Marking, Third Edition, Dec. 1, 1995.
ISO/IEC 15416: International Standard, Information Technology—Automatic Identification and Data Capture Techniques—Bar Code Print Quality Test Specification—Linear Symbols, First Edition, Aug. 15, 2000.
Hoel, Lester A., Giuliano, Genevieve and Meyer, Michael D., Portions of Intermodal Transportation: Moving Freight in a Global Economy, Copyright Eno Transportation Foundation, 2011.
Itsumi Nagahama, English translation of Japan Unexamined Application No. S4871029, Dec. 14, 1971.
Non-Final Office Action dated Apr. 26, 2018 for co-pending U.S. Appl. No. 15/616,783.
Final Office Action dated Apr. 23, 2018 for co-pending U.S. Appl. No. 14/848,447.
Final Office Action dated Mar. 16, 2018 for co-pending U.S. Appl. No. 14/996,362.
Final Office Action dated Mar. 14, 2018 for co-pending U.S. Appl. No. 15/144,450.
Final Office Action dated Jan. 22, 2018 for co-pending U.S. Appl. No. 13/628,702.
Final Office Action dated Jan. 25, 2018 for co-pending U.S. Appl. No. 15/602,666.
Final Office Action dated Feb. 6, 2018 for co-pending U.S. Appl. No. 15/475,354.
Non-Final Office Action dated Feb. 9, 2018 for co-pending U.S. Appl. No. 15/587,926.
Non-Final Office Action dated Feb. 15, 2018 for co-pending U.S. Appl. No. 14/922,836.
Final Office Action dated Dec. 27, 2017 for co-pending U.S. Appl. No. 14/943,182.
Smith, Ryan E., Prefab Architecture, A Guide to Modular Design and Construction, John Wiley & Sons, Inc., 2010.
Osha-Niosh, Hazard Alert: Worker Exposure to Silica during Hydraulic Fracturing, Jun. 2012.
Tremoglie, Michael P., Legal NewsLine, OSHA, NIOSH issue fracking health alert (/stories/510527440-oshaniosh-issue-fracking-health-alert), Jun. 25, 2012.
Beckwith, Robin, Proppants: Where in the World, Journal of Petroleum Technology, Apr. 2011.
Final Office Action dated Feb. 27, 2018 for co-pending U.S. Appl. No. 15/143,942.
International Search Report for related International Application No. PCT/US2012/066639, dated Feb. 25, 2013.
International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.

(56) References Cited

OTHER PUBLICATIONS

International Preliminary Report on Patentability for PCT/US2012/066639, dated Feb. 26, 2013.
International Preliminary Report on Patentability for PCT/US2013/032819, dated Sep. 23, 2014.
International Search Report for PCT/US2015/012990, dated May 6, 2015. (15 pages).
FS-35 Desert Frac-Sander& NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, filed Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May 2013.
SandBox Logistics, LLC, screenshots from video made in Apr. 2013 and publicly shown in May 2013, Arnegard, North Dakota.
International Search Report for PCT/US15/35635, dated Oct. 30, 2015. (12 pages).
PCT International Search Report for PCT/US15/49074, dated Dec. 17, 2015. (11 pages).
PCT International Search Report for PCT/US15/57601, dated May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
International Organization for Standardization, ISO 668:1995(E).
International Organization for Standardization, ISO 668:1995(E)/Amd.1:2005(E).
International Organization for Standardization, ISO 668:1995(E)/Amd.2:2005(E).
International Organization for Standardization, ISO 1496-1:1990/Amd.1:1993(E).
International Organization for Standardization, ISO 1496-1:1990/Amd.2:1998(E).
International Organization for Standardization, ISO 1496-1:1990/Amd.3:2005(E).
International Organization for Standardization, ISO 1496-1:1990/Amd.4:2006(E).
International Organization for Standardization, ISO 1496-1:1990/Amd.5:2006(E).
Rastikian, K. et al., Modelling of sugar drying in a countercurrent cascading rotary dryer from stationary profiles of temperature and moisture, Journal of Food Engineering 41 (1999).
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
Non-Final Office Action dated Feb. 24, 2017 for co-pending U.S. Appl. No. 14/943,182.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Apr. 3, 2017 for co-pending U.S. Appl. No. 13/555,635.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.

(56) References Cited

OTHER PUBLICATIONS

Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 6, 2017 for co-pending U.S. Appl. No. 14/927,614.
Final Office Action dated Jun. 21, 2017 for co-pending U.S. Appl. No. 14/943,182.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4 pages).
WW Trailers Inc., Model GN204S9A datasheet, Portland, OR, Jan. 2007 (4 pages).

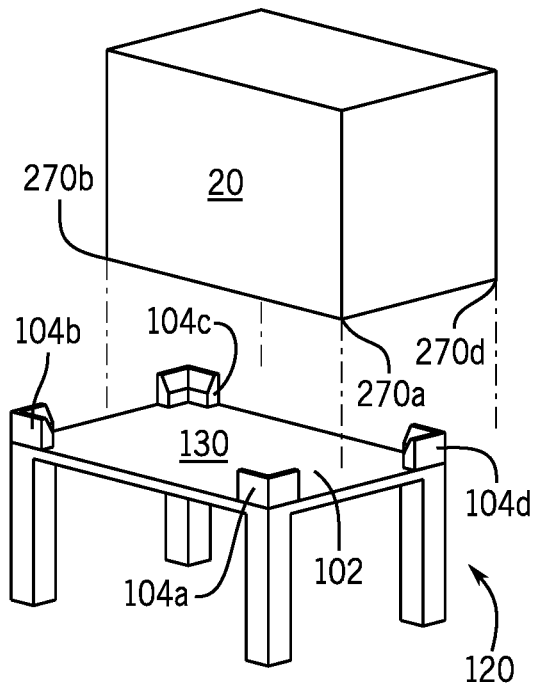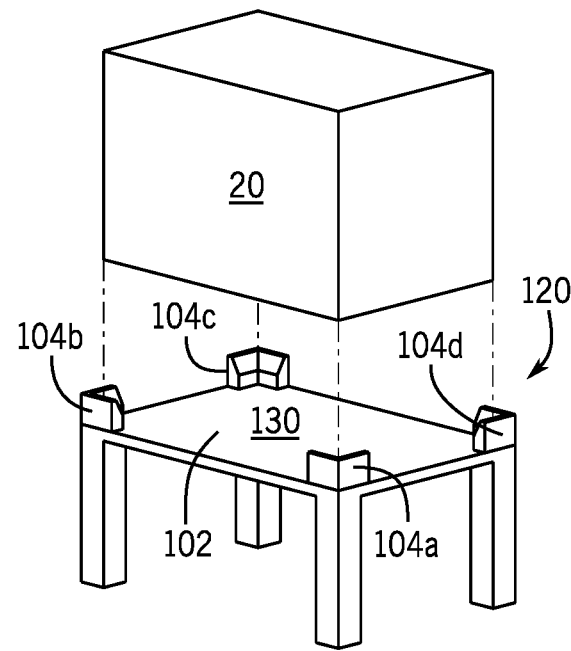
FIG. 20    FIG. 21
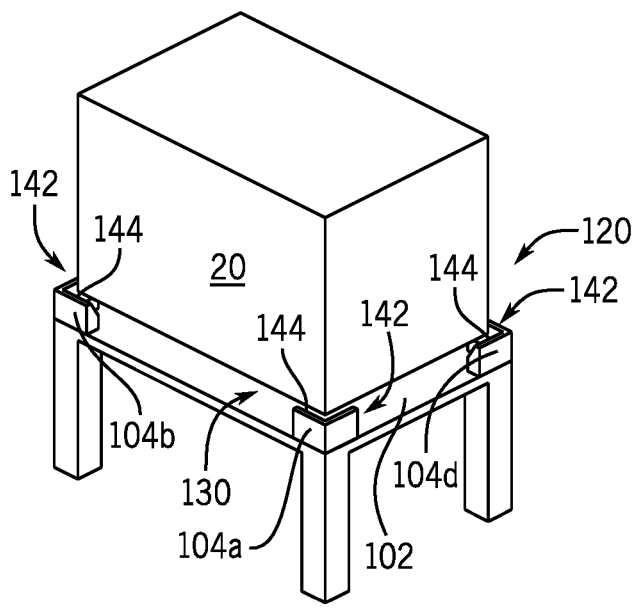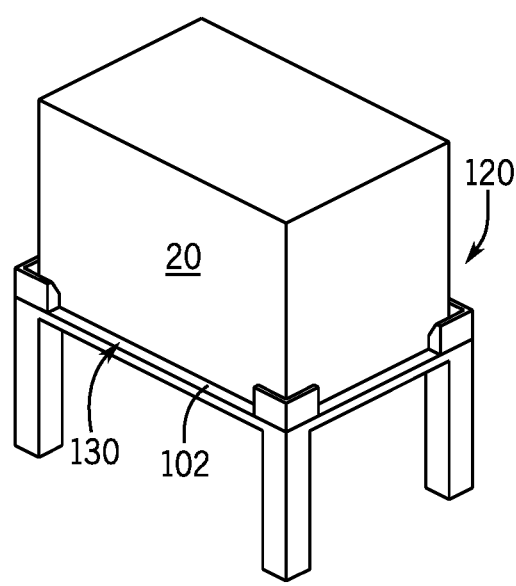
FIG. 22    FIG. 23

CRADLE FOR PROPPANT CONTAINER HAVING TAPERED BOX GUIDES AND ASSOCIATED METHODS

RELATED APPLICATIONS

This present application is a continuation which claims priority to and the benefit of U.S. Non-Provisional application Ser. No. 15/426,242, filed Feb. 7, 2017, titled "Cradle for Proppant Container Having Tapered Box Guides," now U.S. Pat. No. 9,840,366, issued Dec. 12, 2017, which is a continuation of U.S. Non-Provisional application Ser. No. 14/986,826, filed Jan. 4, 2016, titled "Cradle for Proppant Container Having Tapered Box Guides," now U.S. Pat. No. 9,624,030, issued Apr. 18, 2017, which is a divisional of U.S. Non-Provisional application Ser. No. 14/848,447, filed Sep. 9, 2015, titled "Cradle for Proppant Container Having Tapered Box Guides," which is related to and claims priority to, and the benefit of U.S. Provisional Application No. 62/050,493, filed Sep. 15, 2014, titled "Cradle for Proppant Container Having Tapered Box Guides." U.S. Non-Provisional application Ser. No. 14/848,447 is also a continuation-in-part of U.S. Non-Provisional application Ser. No. 14/676,039, filed Apr. 1, 2015, titled "Methods and Systems to Transfer Proppant for Fracking with Reduced Risk of Production and Release of Silica Dust at a Well Site," now U.S. Pat. No. 9,340,353, issued May 17, 2016, which claims priority to U.S. Provisional Application No. 62/012,160, filed Jun. 13, 2014, titled "Process and Apparatus for Reducing Silica Exposure During the Delivery of Proppants to a Mine," U.S. Provisional Application No. 62/014,479, filed on Jun. 19, 2014, titled "System and Methods for Reducing Silica Exposure at a Well Site," and U.S. Provisional Application No. 62/114,614, filed February U.S. Non-Provisional application Ser. No. 14/848,447 is also a continuation in part of U.S. Non-Provisional application Ser. No. 13/628,702, filed Sep. 27, 2012 titled "Proppant Discharge System and a Container for Use in Such a Proppant Discharge System," which is a continuation in part of U.S. Non-Provisional application Ser. No. 13/555,635, filed Jul. 23, 2012, titled "Proppant Discharge System Having a Container and the Process for Providing Proppant to a Well Site," now U.S. Pat. No. 9,718,610, issued Aug. 1, 2017, each of which are incorporated herein in their entireties by reference.

BACKGROUND

1. Field of the Invention

The present invention relates to positioning and aligning proppant containers at a well site. More particularly, the present invention relates to systems and methods to position and align proppant containers onto stands and/or conveyors at the well site.

2. Description of Related Art

Hydraulic fracturing or "Fracking" has been used for decades to stimulate production from conventional oil and gas wells. In recent years, the use of fracking has increased due to the development of new drilling technology such as horizontal drilling and multi-stage fracking. Such techniques reach previously-unavailable deposits of natural gas and oil. Fracking generally includes pumping fluid into a wellbore at high pressure. Inside the wellbore, the fluid is forced into the formation being produced. When the fluid enters the formation, it fractures, or creates fissures, in the formation. Water, as well as other fluids, and some solid proppants, are then pumped into the fissures to stimulate the release of oil and gas from the formation.

By far the dominant proppant is silica sand, made up of ancient weathered quartz, the most common mineral in the Earth's continental crust. Unlike common sand, which often feels gritty when rubbed between your fingers, sand used as a proppant tends to roll to the touch as a result of its round, spherical shape and tightly-graded particle distribution. Sand quality is a function of both deposit and processing. Grain size is critical, as any given proppant should reliably fall within certain mesh ranges, subject to downhole conditions and completion design. Generally, coarser proppant allows a higher capacity due to the larger pore spaces between grains. This type of proppant, however, may break down or crush more readily under stress due to the relatively fewer grain-to-grain contact points to bear the stress often incurred in deep oil- and gas-bearing formations.

During fracking operations, workers may transport containers holding the proppant between rail cars, trucks, staging areas, or the like and stands or container holders. For example, work vehicles (e.g., cranes, fork lifts, etc.) may be used to transport the containers between different locations at the work site. Often, renting and/or purchasing the equipment for transporting and moving the containers is expensive, therefore, efficiency with transportation and movement is desirable to decrease costs for owners and operators. Typically, the stands or container holders include protruding features (e.g., fasteners, protrusions, etc.) that align with corresponding recessed features of the containers to secure and align the containers on the stands or holders. However, aligning the respective features may be time consuming and difficult for workers using large equipment, where visibility of the features on the stands or containers may be decreased. It is now recognized that improvements for positioning containers onto the stands or holders is desirable.

SUMMARY

Applicants recognized the problems noted above herein and conceived and developed embodiments of systems and methods, according to the present invention, to position proppant containers onto racks, holders, conveyors, or the like.

In an embodiment an apparatus to support a proppant container includes a frame o receive and support the proppant container, the frame having a top surface that receives and positions the proppant container above a conveyor to carry proppant disposed thereon away from the proppant container. The apparatus also includes a box guide assembly positioned on the top surface. The box guide assembly includes a corner assembly having two wall segments positioned substantially perpendicular to one another and to the top surface, the corner assembly positioned on a peripheral edge of the frame to at least partially define a desired location for positioning the proppant container. The box guide assembly also includes a guide member extending upwardly and positioned substantially perpendicular to the top surface, the guide member positioned adjacent the corner assembly. The box guide assembly also includes a tapered portion of the guide member extending distally from the top surface, such that a first width of the tapered portion at a top portion of the guide member is less than a second width of the tapered portion at a bottom portion of the guide member, the tapered portion contacting and directing the proppant container to the desired location when the proppant container is being positioned thereon.

In another embodiment a system to store and support proppant containers includes a plurality of proppant containers. Each of the proppant containers of the plurality of proppant containers includes walls forming a periphery of the proppant container, an upper side, and a bottom side forming a compartment to store the proppant therein. The bottom side having an outlet formed therein to facilitate removal of the proppant from the proppant container. The system also includes a cradle for receiving and supporting the plurality of proppant containers, the cradle having a plurality of cradle sections defining a desired location on the cradle associated with respective proppant containers of the plurality of proppant containers. Each proppant container is positioned on a top surface of the cradle. Moreover, the system includes a plurality of box guide assemblies positioned on the top surface of the cradle at respective edges of the plurality of cradle sections to at least partially define the desired location of each cradle section. The box guide assemblies each have a tapered portioned to direct each proppant container of the plurality of proppant containers into the respective cradle section.

In a further embodiment, a method for moving and supporting proppant containers includes lifting a proppant container to a position above a top surface of a support structure, the position being vertically higher relative to a ground plane than a top portion of a box guide assembly. The method also includes aligning the proppant container over a section of the support structure which receives and supports the proppant container, the section defining a desired location for the proppant location. The method further includes lowering the proppant container toward the support structure such that a bottom surface of the proppant container is at a position vertically lower than the top portion of the box guide assembly. The method also includes positioning the proppant container within an area of the section at least partially defined by the box guide assembly via at least one tapered surface of the box guide assembly, the at least one tapered surface positioned on a top surface of the support structure to guide the proppant container toward the desired location.

BRIEF DESCRIPTION OF DRAWINGS

The foregoing aspects, features, and advantages of the present invention will be further appreciated when considered with reference to the following description of embodiments and accompanying drawings. In describing the embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

FIG. 20 is a top plan view of an embodiment of a container misaligned with a desired location of a cradle, according to the present disclosure;

FIG. 21 is a top plan view of an embodiment of a container aligned over a top surface of a cradle, according to the present disclosure;

FIG. 22 is a top plan view of an embodiment of a container in contact with a box guide assembly on a top surface of a cradle, according to the present disclosure;

FIG. 23 is a top plan view of an embodiment of a container on a top surface of a cradle, according to the present disclosure;

DETAILED DESCRIPTION

The foregoing aspects, features, and advantages of the present invention will be further appreciated when considered with reference to the following description of embodiments and accompanying drawings. In describing the embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include box guide assemblies for adjusting the alignment of a container being positioned onto a surface. For example, the box guide assemblies may be positioned on a top surface of a cradle. The box guide assemblies include guide members having a tapered portion that contacts the container when the container is not aligned with the surface. For example, as the container is lowered toward the top surface, the container may contact the tapered portion of the guide members. The tapered portions may include incline edges that receive the container and direct the container toward a desired location on the top surface. As a result, even when the container is misaligned, the container may be directed toward the top surface by the box guide assemblies without manual realignment of the containers.

Figure 1:
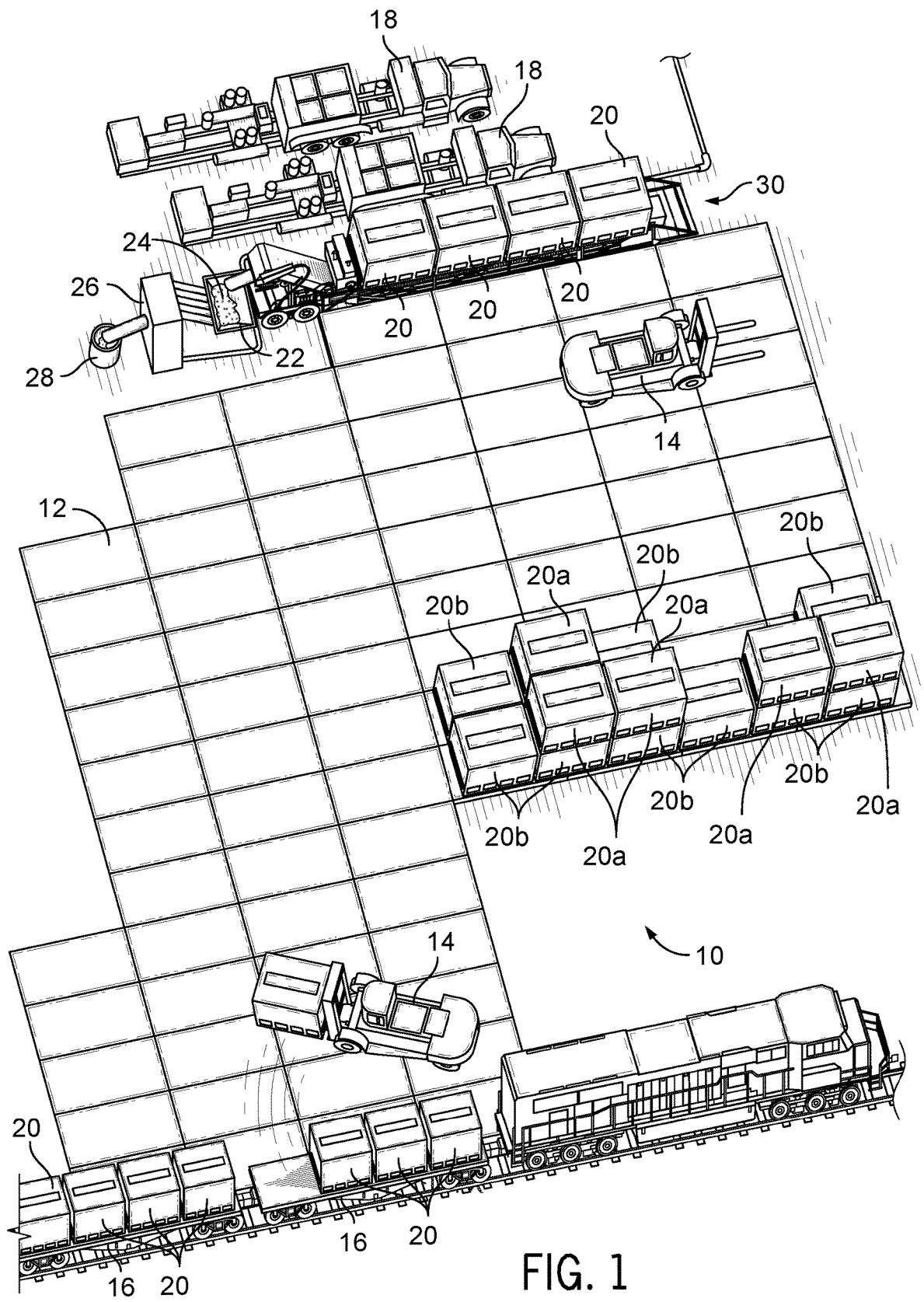
FIG. 1 is an environmental perspective view of an embodiment of a well site for fracking using an embodiment of the system and method, according to the present disclosure.

Turning to FIG. 1, is an environmental perspective view of a well site 10 for fracking using certain embodiments of the present disclosure. In the illustrated embodiment, the well site 10 includes a removable floor 12 (e.g., made of wood, metal, polymers, or the like) to facilitate the use of heavy machinery, including one or more forklifts 14, for loading and unloading railroad cars 16 or trucks 18 carrying one or more containers 20 (e.g. proppant containers), containing proppant. However, in other embodiments, cranes, jacks, or other prime movers, may be used at the well site 10 for loading, unloading, and/or positioning (e.g., staging) the containers 20. In the illustrated embodiment, the containers 20 are positioned in a side-by-side configuration on the railroad cars 16. As shown, four containers 20 are arranged on each railroad car 16. However, in other embodiments, different configurations of the containers 20 on the railroad car 16 may be utilized to account for engineering design conditions (e.g., the weight of the containers, the size of the containers, the staging area at the well site, etc.)

The containers 20 are stackable at the well site 10, thereby potentially decreasing the foot print occupied by the containers 20. For example, containers 20a may be stacked on top of other containers 20b. As such, the containers 20 may be filled with proppant and stacked at the well site 10, thereby reducing logistical problems related to delivering and unloading loose proppant at well sites 10. The well site 10 may also include blenders 22 for combining proppant 24, which may consist of mined silica sand, but potentially also coated or treated sand, ceramic, or bauxite, with fracking fluids. The well site also can include fracking machinery 26 to pump the proppant 24 and other fracking fluids into a wellbore 28 at high pressure. In the illustrated embodiment, a conveyor system 30 receives the containers 20 proximate the blenders 22. In certain embodiments, the conveyor system 30 includes a conveyor belt that receives the proppant 24 from the containers 20 and transports the proppant 24 to the blenders 22 for further use in the wellbore 28.

Figure 2:
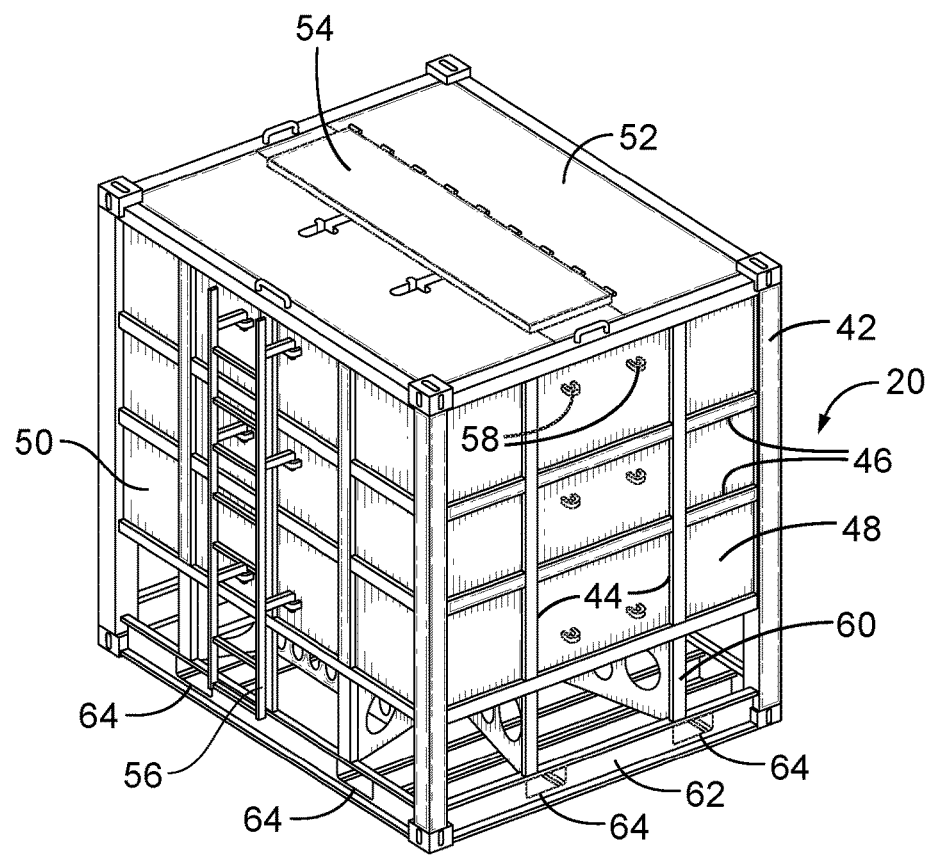
FIG. 2 is a perspective view of an embodiment of a container, according to the present disclosure.

FIG. 2 is a perspective view of an embodiment of the container 20 for storing, shipping, and distributing the proppant 24. In the illustrated embodiment, the container 20 includes a frame 42 having substantially vertical cross members 44 and substantially horizontal cross members 46. However, in other embodiments, the frame 42 may include only vertical cross members 44, only horizontal cross members 46, or cross members positioned at an incline. Furthermore, while the illustrated embodiments includes the cross members 44, 46 on an outer surface of the container 20, in other embodiments the cross members 44, 46 may be located on the interior surface of the container 20. As will be appreciated, the cross members 44, 46 provide support to the container 20 when the container 20 is filled with proppant 24. An end wall 48 is shown on one end of the container 10, which is adjacent and perpendicular to a sidewall 50. An upper side 52 of the container 10 projects perpendicularly to and between end wall 48 and the side wall 50. The end wall 48, sidewall 50, a second end wall (not pictured), and a second sidewall (not pictured) define a lateral periphery of an interior volume of the container 20 in which to store the proppant 24. Moreover, the upper side 52 includes a hatch 54, in the illustrated embodiment, to permit access to the interior volume of the container 20. For example, the container 20 may be filled with proppant 24 via the hatch 54.

As shown in the illustrated embodiment, the container 20 includes several support features to permit operators access to the container. For example, a ladder 56 is positioned on the sidewall 50 to permit access to the upper side 52. Moreover, attachment hooks 58 enable cables or tie down supports to be attached to the container 20 during loading, unloading, or transportation operations. For example, operators may attach tie downs (e.g., ropes, straps, etc.) to the attachment hooks 58 to secure the container 20 to the truck 18. Furthermore, the container 20 includes compartment supports 60 projecting radially inward from an open space below the end wall 48 and the sidewall 50. The compartment supports 60 are coupled to a lower girder 62 of the frame 42. Additionally, the container 20 includes slots 64 extending through the lower girders 62. The slots 64 may enable forks of the forklifts 14 to engage the frame 42 and transport the container 20 between different locations.

Figure 3:
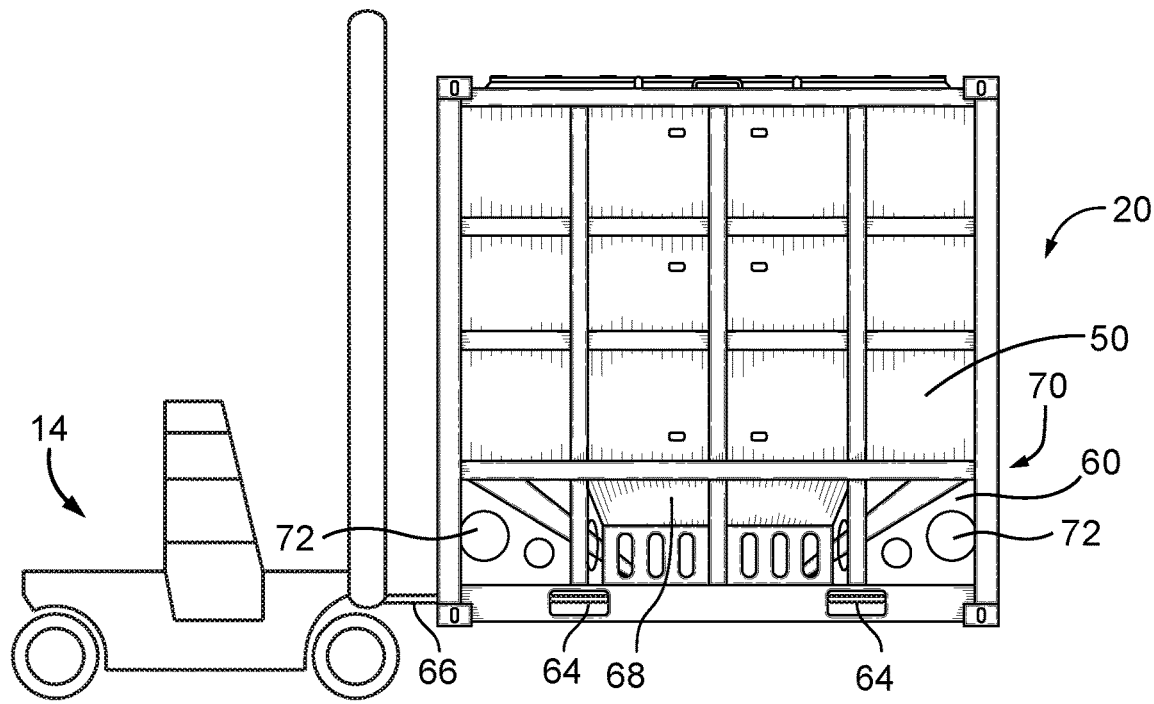
FIG. 3 is a front elevation view of the container of FIG. 2 positioned on forks of a forklift, according to the present disclosure.

FIG. 3 is a schematic side elevation view of the container 20 being lifted by the forklift 14. As shown, the forks 66 of the forklift 14 extend through the slots 64, thereby supporting the container 20 and securing the container 20 to the forks 66 for movement between different locations at the well site 10. As will be described in detail below, in certain embodiments, the forklift 14 may transport the containers 20 from a stacked orientation to the conveyor system 30. The illustrated slots 64 extend through the lower girder 62, isolated from an inclined section 68 (e.g., ramped section, ramped portion) of the container 20. In certain embodiments, the inclined section 68 includes a plurality of ramped sections that direct the proppant 24 toward an outlet. As a result, the likelihood of damage to the inclined section 68 during transportation is decreased, because the forks 66 do not contact the inclined section 68, or the gap 70 around the inclined section 68. As shown, the gaps 70 permit visual inspection of the area surrounding the inclined section 68. For example, during international shipment, visual inspection may be desirable. However, in certain embodiments, the compartment supports 60 may include openings 72 which receive the forks 66. It will be appreciated that the location of the slots 64 and/or openings 72 may be particularly selected based on the forklifts 14 in use at the well site 10, as well as for other manufacturing, assembly, or production concerns. In this manner, the forks 66 may engage the lower girder 62, compartment supports 60, or other features of the frame 42 to transport the container 20 between different locations.

Figure 4:
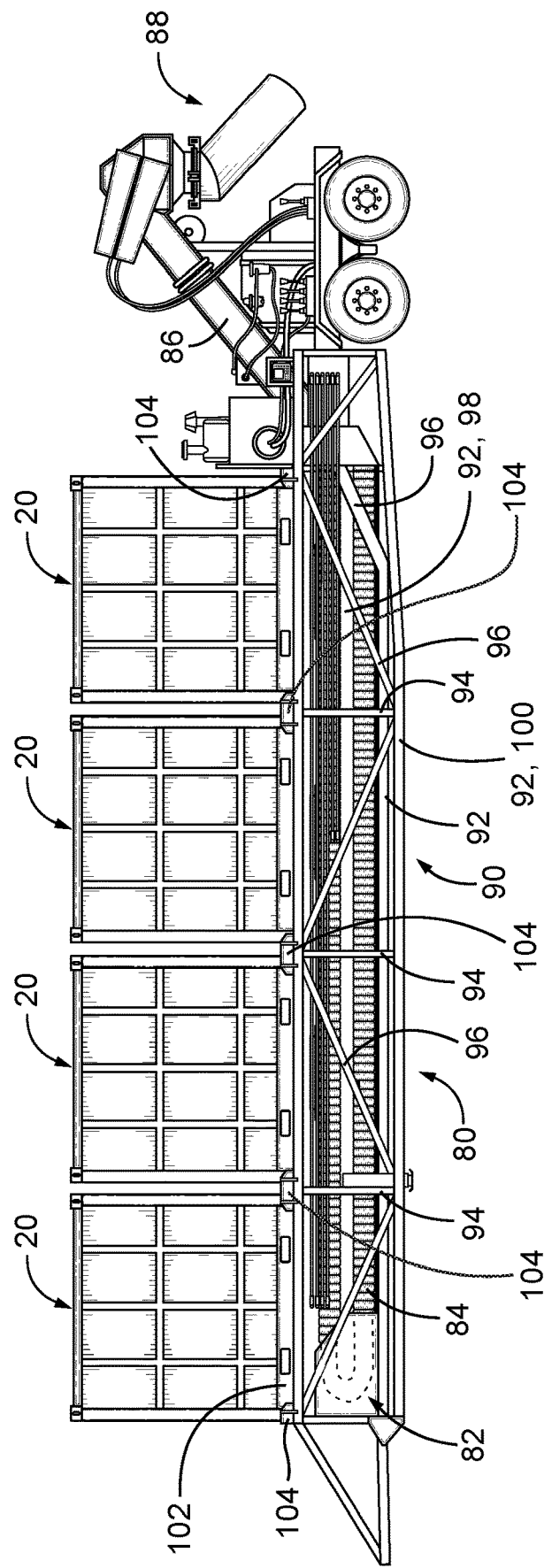
FIG. 4 is a side elevation view of an embodiment of a conveyor system having containers positioned thereof, according to the present disclosure.

FIG. 4 is a schematic side elevation view of an embodiment of the containers 20 positioned on a cradle 80 of the conveyor system 30. For example, the conveyor system 30 may be part of a moveable rig for transporting the positioning the containers near the well bore 28. In the illustrated embodiment, the cradle 80 includes a conveyor 82 for receiving and distributing proppant 24 from within the containers 10. The conveyor 82 includes a moving belt 84 that transports the proppant 24 to a ramp 86, that in turn delivers the proper 24 to a chute system 88. From the chute system 88 the proppant 24 makes its way to the wellbore 28 after passing through the blender 22 and fracking machinery 26.

In the illustrated embodiment, the cradle 80 includes a structural frame 90 (e.g., frame) having cage-like support structure including horizontal support members 92, vertical support members 94, and inclined support members 96. Moreover, the horizontal support members 92 include an upper support member 98 and a lower support member 100. In the illustrated embodiment, the upper support member 98 has a top surface 102 which receives and supports the containers 20. For example, in the illustrated embodiment, the containers 20 are arranged in a side-by-side configuration such that individual containers 20 may be removed from the cradle 80 without disturbing adjacent containers. In certain embodiments, the containers 20 are not in contact with adjacent containers 20. However, in other embodiments, the containers 20 may be in contact with adjacent containers. Furthermore, box guide assemblies 104 are mounted on the top surface 102 at intervals along a length of the cradle 80. For example, the illustrated embodiment includes eight box guide assemblies 104 positioned in a spaced relationship relative to one another. For example, the box guide assemblies 104 may be separated by approximately one container 20 width. Also, the box guide assemblies 104 may be closely spaced (e.g., less than one container 20 width) or in contact with one another. As will be appreciated, the location of the box guide assemblies 104 may be particularly selected to accommodate design and/or manufacturing considerations. However, in other embodiments, there may be 1, 2, 3, 4, 5, 6, 7, 9, 10, 20, 30, 40, or any suitable number of box guide assemblies 104. For example, as will be described below, each section (e.g., segment, partition) of the cradle 80 may include four box guide assemblies 104 to direct and guide the containers 20 into the sections. In certain embodiments, the box guide assemblies 104 include inserts which contact the containers 20 during installation to guide the containers 20 into the sections and/or to desired locations along the cradle 80. However, in other embodiments, the box guide assemblies 104 have guide members and/or tapered sections integrally formed to the box guide assemblies 104 to guide the containers 20 into the sections.

Figure 5:
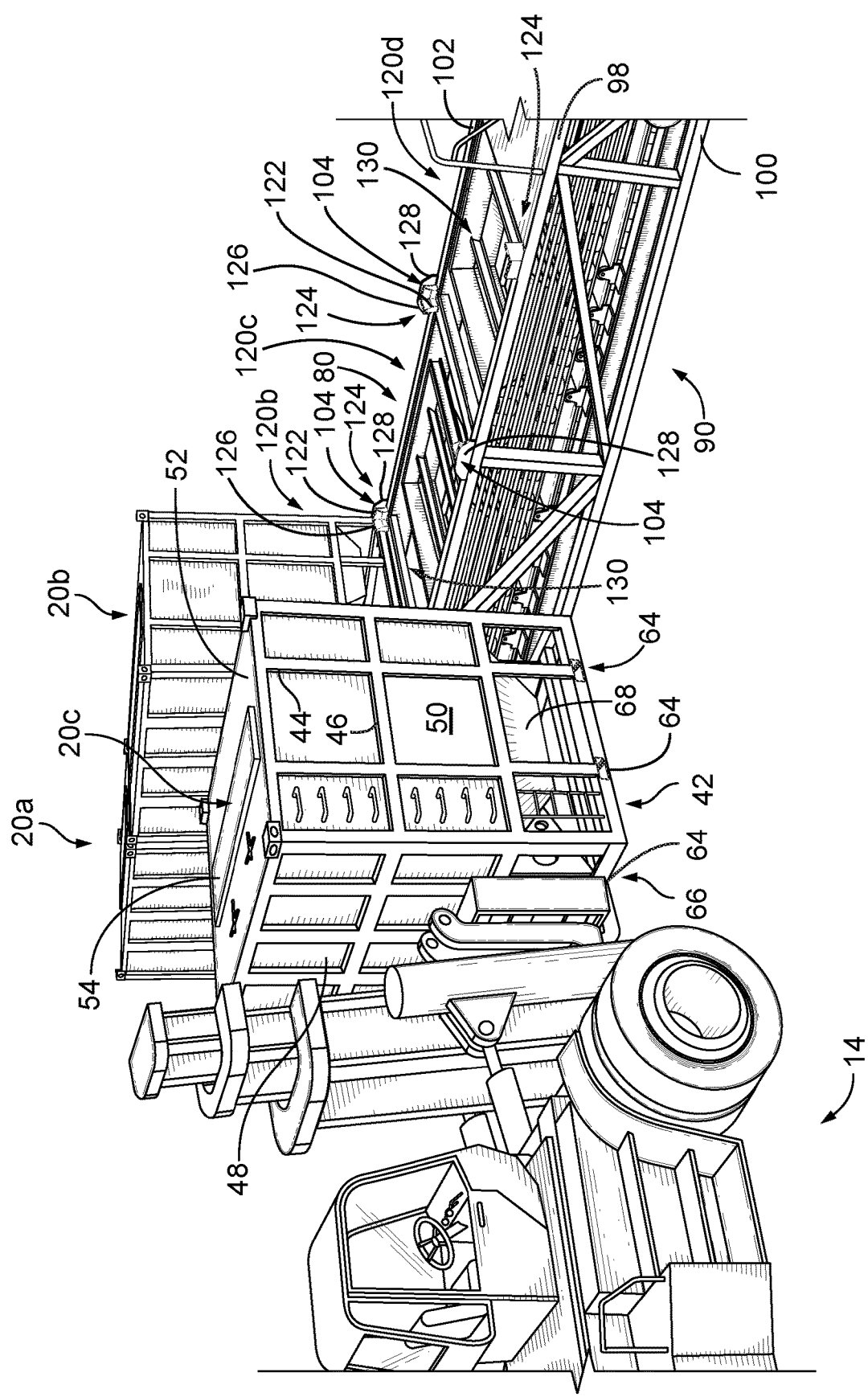
FIG. 5 is a perspective view of an embodiment of a forklift preparing to position a container having proppant for fracking onto a conveyor, according the present disclosure.

FIG. 5 is a perspective view of an embodiment of the container 20 being moved to the cradle 80 via the forklift 14. As shown, the forks 66 engage the slots 64 of the frame 42 to lift the container 20 toward the cradle 80. In the illustrated embodiment, two containers 20a, 20b are already positioned on the cradle 80 while the third container 20 is moved by the forklift 14 to position the containers 20 in a side-by-side configuration along the length of the cradle 80. Each container 20 is aligned with a respective cradle section 120 defined at least partially by the respective box guide assemblies 104. For example, the first container 20a is positioned within the first cradle section 120a, the second container 20b is positioned within the second cradle section 120b, the third container 20c is moved toward the third cradle section 120c via the forklift 14, and a fourth cradle section 120d is proximate the third cradle section 120c. In this manner, the containers 20 may be positioned on and/or removed from the cradle 80 without disturbing adjacent containers. For example, the proppant 24 may be flowing out of the containers 20a, 20b while the container 20c is being positioned onto the cradle 80.

As described above, the box guide assemblies 104 are positioned on the top surface 102 of the upper support member 98, thereby at least partially defining the cradle sections 120. In the illustrated embodiment, the box guide assemblies 104 are positioned at corners of the cradle sections 120, and, as a result, each cradle section 120 is at least partially defined by four box guide assemblies 104. However in certain embodiments, each cradle section 120 may include more or fewer box guide assemblies 104. For example, the box guide assemblies 104 may be positioned at opposite corners of the cradle sections 120, along one side of the cradle sections 120, at particularly selected corners of the cradle sections 120, or any combination thereof.

In certain embodiments, the box guide assemblies 104 include guide members 122 to direct the container 20 into the cradle sections 120 when the container 20 is not aligned with the cradle section 120 during installation. That is, the guide members 122 move the container 20 from an improper or undesirable alignment to a proper or desirable alignment that allows the container 20 to rest on the top surface 102. The guide member 122 is positioned adjacent a corner assembly 124 having a pair of walls 126, 128 that form a portion of the box guide assembly 104. As shown, the walls 126, 128 are substantially perpendicular to one another, and substantially perpendicular to the top surface 102. In other words, the walls 126, 128 form a substantially 90-degree angle relative to one another and relative to the top surface 102. As used herein with respect to angles, substantially is equal to plus or minus 15 degrees. Moreover, in certain embodiments, adjacent box guide assemblies 104 may share one or more walls 126, 128. For example, the wall 126 may extend along the top surface and accommodate adjacent cradles sections 120e, 120f. Moreover, the wall 128 may be utilized by both cradle sections 120c, 120d. In other words, the cradle section 120c may be associated with a first side of the wall 128, while the cradle section 120d is associated with a second, opposite side of the wall 128.

The guide members 122 are positioned adjacent the walls 126, 128 and direct the container 20 into the cradle section 120 if the container 20 is not aligned with the cradle section 120 during installation. In other words, the guide members 122 guide the container 20 to a desired location 130 on the cradle 80. In certain embodiments, the desired location 130 is the associated cradle section 120. However, in other embodiments, the desired location 130 may be a slot, recess, opening, or the like in the cradle 80 that receives the container 20, a corresponding feature to lock the container 20 to the cradle 80, or the like. For example, the desired location 130 may be a recessed section in the top surface 102 which substantially blocks axial movement of the container 20 while the container 20 is in the desired location 130. As will be described in detail below, the guide members 122 include a tapered portion which contacts the container 20 when the container 20 is not aligned with the cradle section 120 to drive the container 20 toward the desired location 130.

During installation, the forklift 14 raises the container 20 above the corner assemblies 124, thereby allowing the lower girder 62 to clear a height of the walls 126, 128. In other words, the container 20 is moved to a vertical position (e.g., elevation) higher than the walls 126, 128, relative to a ground plane. Moreover, the forklift 14 may position the container 20 over the cradle 80, for example, by extending the forks 66 away from the forklift 14. However, as shown, the size of the container 20 may reduce visibility of the cradle 80 and/or the cradle sections 120. In certain embodiments, additional operators may guide the forklift operator as the container 20 is positioned on the cradle 80. However, by utilizing the disclosed guide members 122, the container 20 may be misaligned with the cradle sections 120, but the guide members 122 may guide the container 20 into the proper position (e.g., toward the desired location 130) on the cradle 80. As a result, the efficiency of positioning the containers 20 onto the cradles 80 may be improved because operators will be able to load containers 20 faster due to the guide members 122 providing alignment of the containers 20 onto the cradle sections 120 instead of utilizing manual alignment.

Figure 6:
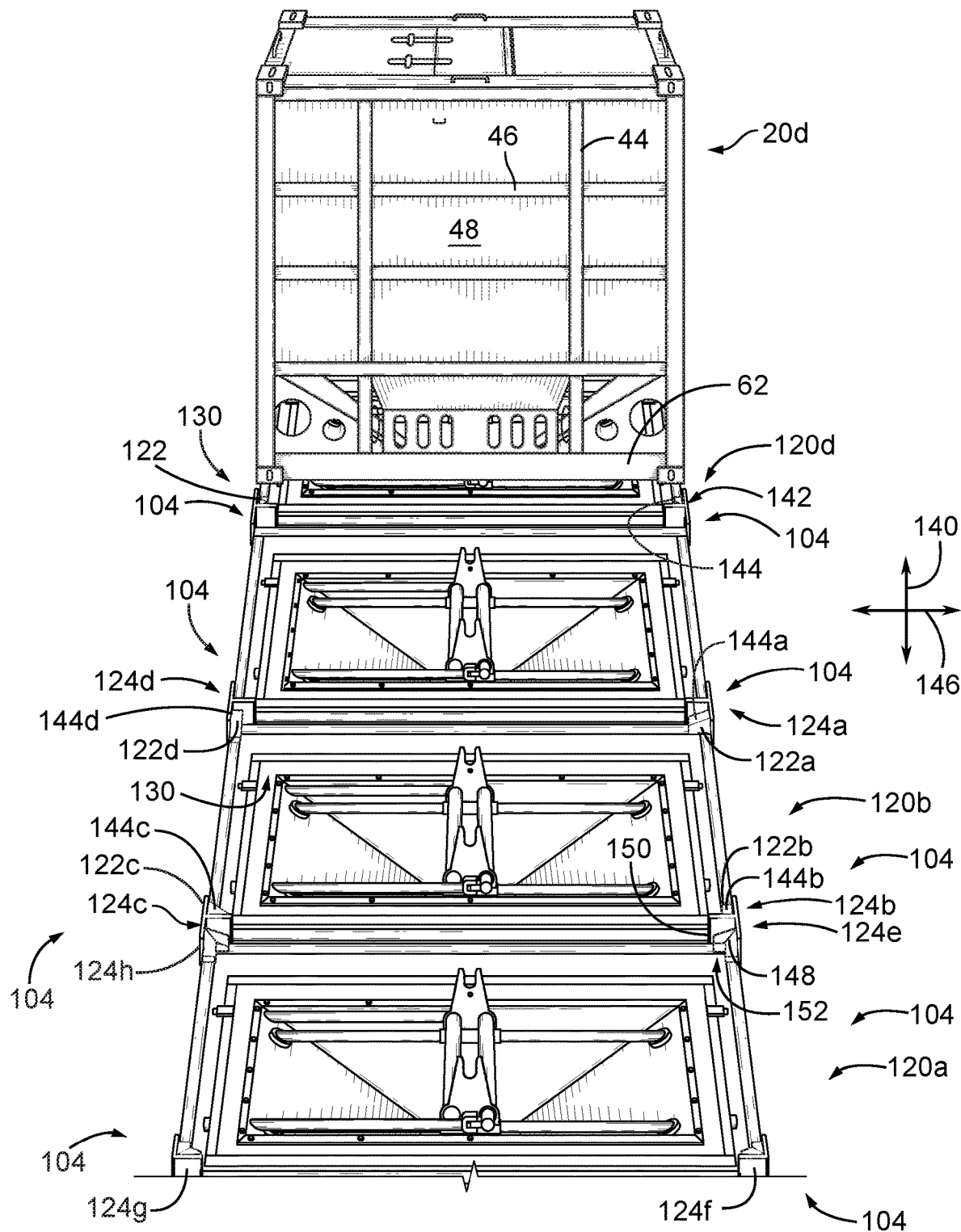
FIG. 6 is a perspective view of an embodiment of a container positioned on a cradle, according to the present disclosure.

FIG. 6 is a perspective view of an embodiment of the container 20d being positioned over the respective cradle section 120d. Certain features have been removed for clarity. As shown, the container 20d is misaligned with the cradle section 120d such that the end wall 48 is longitudinally displaced from the box guide assemblies 104 along a longitudinal axis 140. That is, as the container 20d is lowered toward the cradle section 120d, the container 20d will contact the box guide assemblies 104 to drive the container 20d toward the desired location 130. For example, the lower girder 62 of the container 20d may contact (e.g., engage, strike, etc.) the guide member 122 of the box guide assembly 104. Specifically, the container 20d may contact a tapered portion 142 of the guide member 122, the tapered portion guiding the container 20d toward the cradle section 120d. That is, the lower girder 62 may slide down an inclined edge 144 of the tapered portion 142 toward the desired location 130. As shown, the inclined edge 144 is downwardly sloped such that the container 20d is encouraged to move toward the desired location 130.

In certain embodiments, the guide members 122 may be arranged such that the containers 20 are driven toward the desired location 130 along two different axes. For example, the inclined edge 144 of the guide members 122 may be arranged to direct the containers 20 toward the desired location 130 along the longitudinal axis 140 and along a lateral axis 146. That is, the guide members 122 may include multiple inclined edges 144 aligned with multiple axes. In the illustrated embodiment, referring to cradle section 120b, the guide members 122a, 122b, 122c, 122d are positioned at each corner assembly 124a, 124b, 124c, 124d to direct the container 20 in one direction along either the longitudinal axis 140 or the lateral axis 146. For example, the inclined portion 144a of the guide member 122a is aligned with the lateral axis 146, thereby being positioned to drive the container along the lateral axis 146. Similarly, the inclined portion 144c of the guide member 122c is aligned with the lateral axis 146, thereby being positioned to drive the container along the lateral axis 146. In this manner, the guide members 122a, 122c may cooperate to laterally align the container 20 within the cradle section 120b, thereby positioning the container at the desired location 130.

Continuing with the discussion of cradle section 120b, the inclined portion 144b of the guide member 122b is aligned with the longitudinal axis 140, thereby being positioned to drive the container along the longitudinal axis 140. Similarly, the inclined portion 144d of the guide member 122d is aligned with the longitudinal axis 140, thereby being positioned to drive the container along the longitudinal axis 140. In this manner, the guide members 122b, 122d may cooperate to longitudinally align the container 20 within the cradle section 120b. It is appreciated that the guide members 122a, 122b, 122c, 122d may all work in unison to align the container 20 over the cradle section 120b to place the container 20 in the desired location 130. Moreover, while the illustrated embodiment depicts the guide members 122a, 122c aligned with the lateral axis 146 and guide members 122b, 122d aligned with the longitudinal axis 140, in other embodiments, the guide members 122a, 122c may be aligned with the longitudinal axis 140, the guide members 122b, 122d may be aligned with the lateral axis 146, or any combination thereof to facilitate alignment and placement of the container 20 at the desired location 130. Moreover, in certain embodiments, all of the guide members 122 may be aligned along the same axis. For example, with reference to cradle section 120c, each guide member 122 is aligned along the lateral axis 146. In certain embodiments, the container 20 may be substantially square (e.g., the length of the end walls 48 may equal the length of the side walls 50), therefore alignment in one axial direction may be sufficient to position the container 20 in the desired location 130.

In the illustrated embodiment, with reference to cradle section 120a, the guide members 122e, 122f, 122g, 122h are positioned proximate the corner assemblies 124e, 124f, 124g, 124h. As shown, each guide member 122e, 122f, 122g, 122h includes a first inclined edge 148 and a second inclined edge 150 extending along legs 152 of the guide members 122. The first and second inclined edges 148, 150 are aligned with the longitudinal axis 140 and the lateral axis 146, respectively. As a result, the guide members 122e, 122f, 122g, 122h adjust the positioning of the container 20 in at least two axial directions. For example, the guide member 122e may adjust the alignment of the container 20 along both the longitudinal axis 140 (e.g., via the first inclined edge 148) and/or the lateral axis 146 (e.g., via the second inclined edge 150). While the illustrated embodiment includes four guide members 122e, 122f, 122g, 122h, in other embodiments more or fewer guide members 122 may be utilized. Moreover, guide members 122 that adjust the container 20 position along two axial directions may be mixed with guide members 122 that adjust the container 20 position along a single axial direction.

Figure 7:
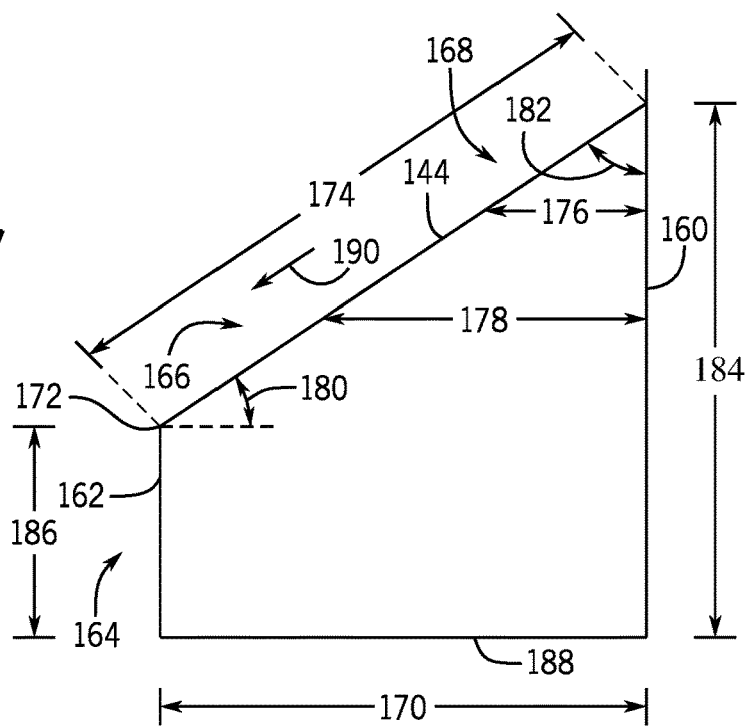
FIG. 7 is a cross-sectional side elevation view of an embodiment of guide member of a box guide assembly, according to the present disclosure.

FIG. 7 is a cross-sectional side view of an embodiment of the guide member 122. As described above, the guide member 122 includes the inclined edge 144 that downwardly slopes from a proximal side 160 to a distal side 162. In operation, the proximal side 160 is positioned proximate at least one wall (e.g., wall 126, wall 128) of the corner assembly 124 and the distal side 162 is positioned proximate the desired location 130. In the illustrated embodiment, the guide member 122 includes a bottom portion 164, a middle portion 166 and a top portion 168. As shown, the bottom portion 164 has a substantially constant first width 170. However, the inclined edge 144 extends from the top portion 168, through the middle portion 166, and terminates at a first end 172 of the bottom portion 164. In other words, the inclined edge 144 extends from the top portion 168 to the first end 172 of the bottom portion 164. As a result, a width of the inclined edge 144 is variable over a length 174 of the inclined edge 144. Yet, in the illustrated embodiment, a second width 176 of the top portion 168 is smaller than the first width 170 of the bottom portion 164. Moreover, at least a portion of a third width 178 of the middle portion 166 is smaller than the first width 170 of the bottom portion 164.

As mentioned above, the inclined edge 144 slopes downwardly from the top portion 168 to the bottom portion 164 (e.g., laterally away from the proximal side 160). A first angle 180 and a second angle 182 define the inclined edge 144. In the illustrated embodiment, the first angle 180 is approximately 50 degrees, relative to the end 172. However, in other embodiments, the first angle 180 may be approximately 10 degrees, approximately 20 degrees, approximately 30 degrees, approximately 40 degrees, approximately 60 degrees, or any other reasonably value. As used herein, approximately refers to plus or minus 5 degrees. Moreover, in other embodiments, the first angle 180 may be between a range of approximately 10 degrees and 40 degrees, approximately 20 degrees and 50 degrees, approximately 30 degrees and 60 degrees, or any other suitable range. It will be appreciated that the first angle 180 may be particularly selected to accommodate anticipated design conditions and/or manufacturing conditions. Furthermore, in the illustrated embodiment, the second angle is approximately 40 degrees, relative to the proximal side 160. However, in other embodiments, the second angle 182 may be approximately 10 degrees, approximately 20 degrees, approximately 30 degrees, approximately 50 degrees, approximately 60 degrees, or any other reasonably value. Moreover, in other embodiments, the second angle 182 may be between a range of approximately 10 degrees and 40 degrees, approximately 20 degrees and 50 degrees, approximately 30 degrees and 60 degrees, or any other suitable range. It will be appreciated that the second angle 182 may be particularly selected to accommodate anticipated design conditions and/or manufacturing conditions.

In the illustrated embodiment, the proximal side 160 extends for a first height 184 and the distal side 162 extends for a second height 186 from a second end 188 of the bottom portion 164. As shown, the first height 184 is larger than the second height 186 due to the downwardly sloping inclined edge 144 extending from the proximal side 160 to the distal side 162. Accordingly, as the container 20 contacts the inclined edge 144, the container 20 will slide down the inclined edge 144 in a direction 190 represented by the arrow due to gravity. In other words, the weight of the container 20 will drive movement of the container 20 down the inclined edge 144 and toward the desired location 130. While the illustrated embodiment includes the inclined edge 144 extending from the top portion 168 to the first end 172 of the bottom portion 164, in other embodiments the inclined edge 144 may extend from the top portion 168 to the second end 188 of the bottom portion 164. In other words, the guide member 122 may have a cross-sectional shape that is substantially a right triangle. As a result, in certain embodiments, the second height 186 may be substantially zero when the inclined edge 144 extends to the second end 188 of the bottom portion 164.

Figure 8:
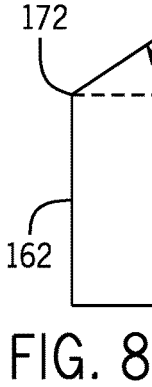
FIG. 8 is a cross-sectional side elevation view of an embodiment of a guide member of a box guide assembly, according to the present disclosure.

FIG. 8 is a cross-sectional side view of an embodiment of the guide member 122. As described above, the guide member 122 includes the inclined edge 144 extending between the proximal side 160 and the distal side 162. In the illustrated embodiment, the top portion 168 includes a curved edge 200 between the inclined edge 144 and the proximal side 160. In other words, the top portion 168 includes a substantially rounded edge. It is appreciated that the curved edge 200 may decrease the likelihood of marring or other cosmetic and/or structural defects to the frame 42 of the container 20 as the container 20 is placed on the cradle 80. Moreover, the curved edge 200 may distribute stresses over the guide member 122 more efficiently than the substantially straight edge illustrated in FIG. 7. As a result, the structural integrity of the guide member 122 may be improved.

Figure 9:
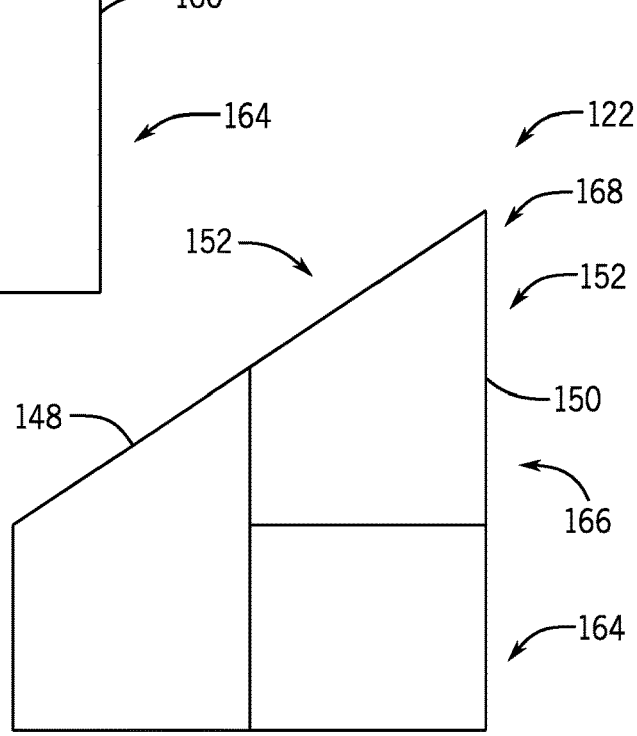
FIG. 9 is a cross-sectional side elevation view of an embodiment of a guide member of a box guide assembly, according to the present disclosure.

FIG. 9 is a cross-sectional side view of an embodiment of the guide member 122 having the legs 152 including the first inclined edge 148 and the second inclined edge 150. As described above, the guide member 122 having the first and second inclined edges 148, 150 may adjust the position of the container 20 in at least two directions as the container 20 is installed onto the cradle 80. Similarly to the embodiment disclosed in FIG. 7, the first inclined edge 148 extends from the proximal side 160 (e.g., the side adjacent the wall 126, 128) to the distal side 162 (e.g., the side adjacent the desired location 130). Moreover, the second inclined edge 150 also extends from the proximal side 160 to the distal side 162. In the illustrated embodiment, the first inclined edge 148 is approximately perpendicular to the second inclined edge 150. Accordingly, the illustrated guide member 122 may correspond to the walls 126, 128 when installed in the box guide assembly 104.

Figure 10:
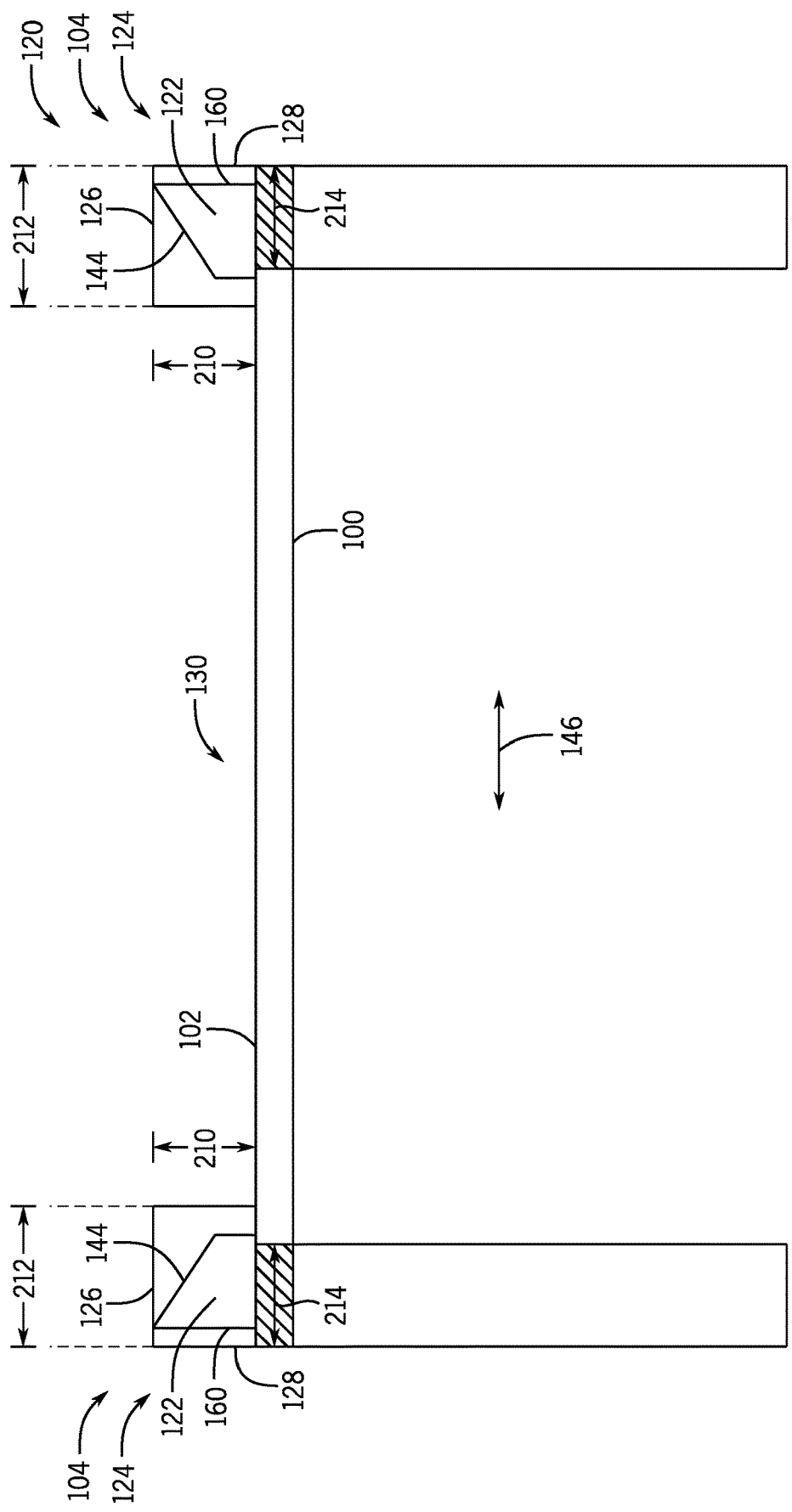
FIG. 10 is a cross-sectional side elevation view of an embodiment of box guide assemblies positioned on a top surface of a cradle, according to the present disclosure.

FIG. 10 is a cross-sectional side view of an embodiment of the cradle section 120 of the cradle 80, in which the guide members 122 are arranged such that the alignment of the container 20 is adjusted in a single direction (e.g., the lateral axis 146). Features of the cradle 80, such as portions of the structural frame 90, have been removed for clarity. As shown, the guide member 122 is positioned adjacent to the corner assembly 124. That is, the proximal side 160 of the guide members 122 is positioned adjacent to the wall 128. In certain embodiments, the guide member 122 and the corner assembly 124 may be a single, integrally formed piece. However, in other embodiments, the guide member 122 may be a separately formed piece. For example, the guide member 122 may be an insert that is coupled to the cradle 80 and/or the corner assembly 124 (e.g., via fasteners, adhesives, or the like). In the illustrated embodiment, the guide members 122 include the inclined edges 144 substantially with the lateral axis 146. Accordingly, the guide members 122 will direct the container 20 toward the desired location 130 along the lateral axis 146.

In the illustrated embodiment, the first height 184 of the guide members 122 is substantially equal to a wall height 210 of the corner assemblies 124. However, in other embodiments, the first height 184 may be smaller than the wall height 210 or larger than the wall height 210. Moreover, each guide member 122 need not be the same height. Furthermore, the first width 170 is less than a wall width 212. That is, the guide members 122 do not extend the full length of the walls 126, 128. For example, in the illustrated embodiment, the first width 170 is approximately one-half of the wall width 212. However, in other embodiments, the first width 170 may be approximately one-eighth of the wall width 212, approximately one-fourth of the wall width 212, approximately three-fourths of the wall width 212, or any other suitable ratio of the wall width 212. Moreover, the first width 170 is less than a support member width 214. Accordingly, by positioning the guide members 122 proximate the corner assembly 124 and the desired location 130, the container 20 may be directed toward the desired location 130 if an operator improperly aligns the container 20 during installation.

Figure 11:
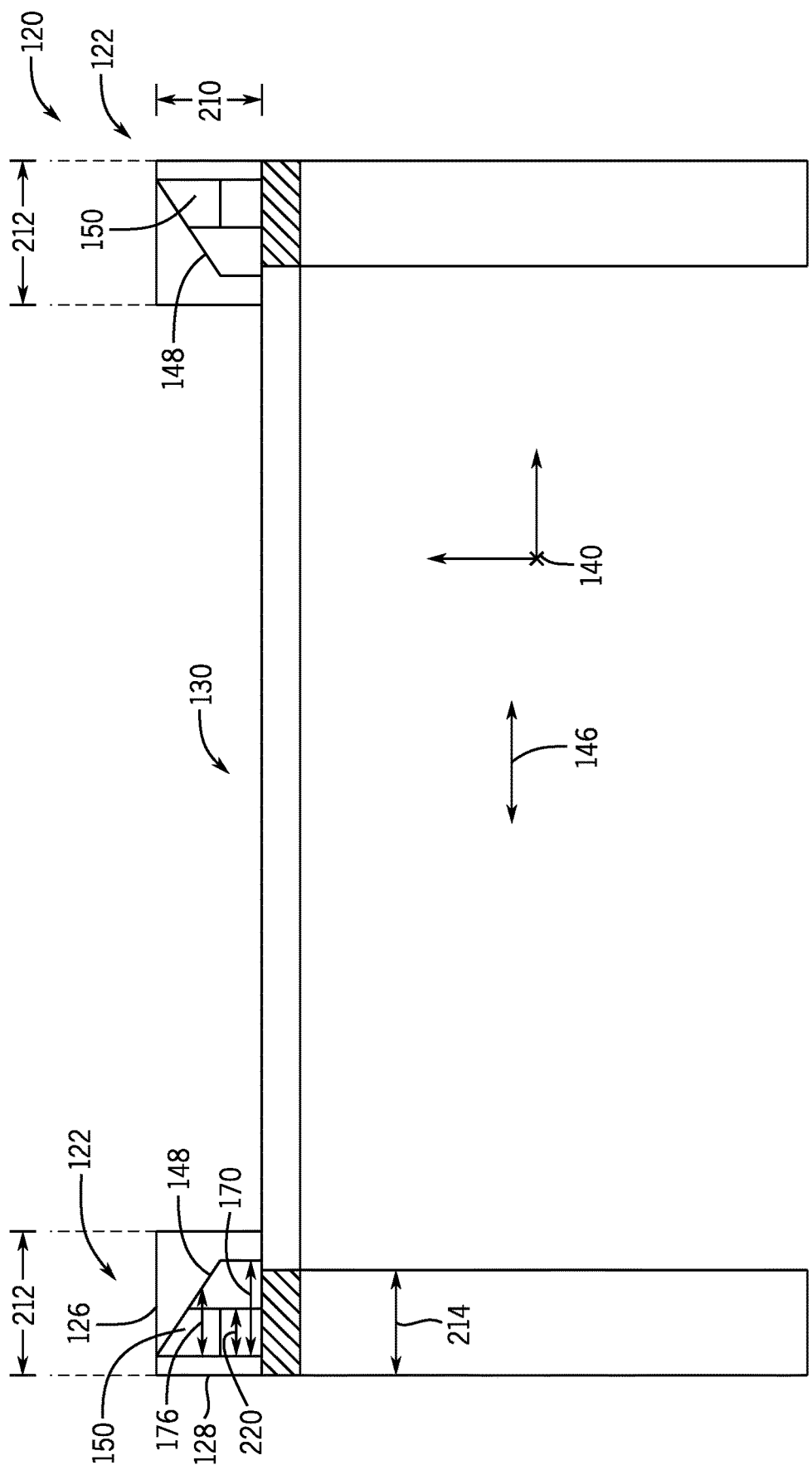
FIG. 11 is a cross-sectional side elevation view of an embodiment of box guide assemblies positioned on a top surface of a cradle, according to the present disclosure.

FIG. 11 is a cross-sectional view of an embodiment of the cradle section 120 of the cradle, in which the guide members 122 are arranged such that the alignment of the container 20 is adjusted in at least two directions (e.g., the longitudinal axis 140, the lateral axis 146). As described above, in certain embodiments, the guide members 122 include the first inclined edge 148 and the second inclined edge 150, each edge being aligned with a different axis (e.g., the longitudinal axis 140 and the lateral axis 146). Because the edges are aligned with different axes, the container 20 may be aligned and/or positioned along both the longitudinal axis 140 and the lateral axis 146. In the illustrated embodiment, the first inclined edge 148 is aligned with the lateral axis 146 (e.g., extending across the plane of the page) and the second inclined edge 150 is aligned with the longitudinal axis 140 (e.g., extending into the plane of the page). As a result, alignment of the container 20 may be adjusted in at least two directions. As shown, the first inclined edge 148 and the second inclined edge 150 form the guide member 122 positioned adjacent to the corner assembly 124. While the illustrated embodiment depicts the guide member 122 as a separate piece, in other embodiments the guide member 122 may be integrally formed into the corner assembly 124. For example, the guide member 122 may be cast, machined, or otherwise coupled to the corner assembly 124 to form an integral part.

In the illustrated embodiment, the first inclined edge 148 and the second inclined edge 150 do not interfere with one another to align and place the container 20 into the desired location 130. For example, a first thickness 220 of the second inclined edge 148 may be particularly selected so that the first thickness 220 is less than the first width 170 and less than the second width 176. As a result, the container 20 would necessarily contact the first inclined edge 148 as the container 20 moved toward the desired location 130 because the first and second widths 170, 176 would extend laterally away from the wall 128 a greater distance than the first thickness 220. In this manner, the guide member 22 may be utilized to align the container 20 on the desired location 130 along both the longitudinal axis 140 and the lateral axis 146. Moreover, as shown in the illustrated embodiment, the first width 170 and the first thickness 220 are less than the support member width 214, thereby enabling the guide member 122 to be positioned on the top surface 102 without blocking the container 20 from being positioned on the top surface 102.

Figure 12:
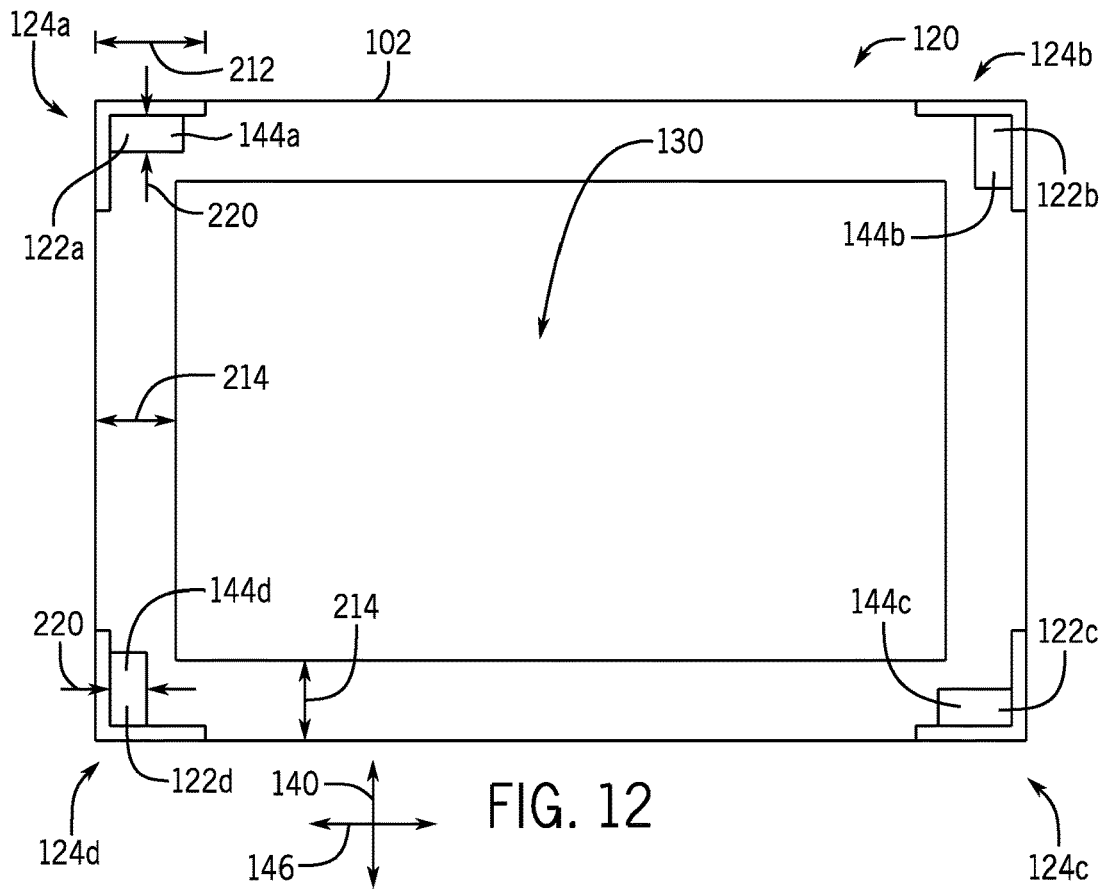
FIG. 12 is a top plan view of an embodiment of box guide assemblies positioned on a top surface of a cradle, according to the present disclosure.

FIG. 12 is a top view of an embodiment of the cradle section 120 having four guide members 122a, 122b, 122c, 122d positioned at each corner of the cradle section 120. As shown, the guide members 122a, 122c are arranged such that the inclined edges 144a, 144c are substantially aligned with the lateral axis 146 and the guide members 122b, 122d are arranged such that the inclined edges 144b, 144d are substantially aligned with the longitudinal axis 140. As a result, while each guide member 122 adjusts the position of the container 20 in one direction, the combination of guide members 122a, 122b, 122c, 122d may adjust the orientation of the container 20 in at least two directions. In the illustrated embodiment, the first thickness 220 of the guide members 122 is smaller than the wall width 212. As a result, the guide members 122 may be arranged on the upper support member 98 of the cradle 98 and not extend toward the desired location 130. In other words, the support member width 214 is larger than the first thickness 220. Therefore, the guide members 122 do not interfere with placing the container 20 on the top surface 102 of the upper support member 98.

Figure 13:
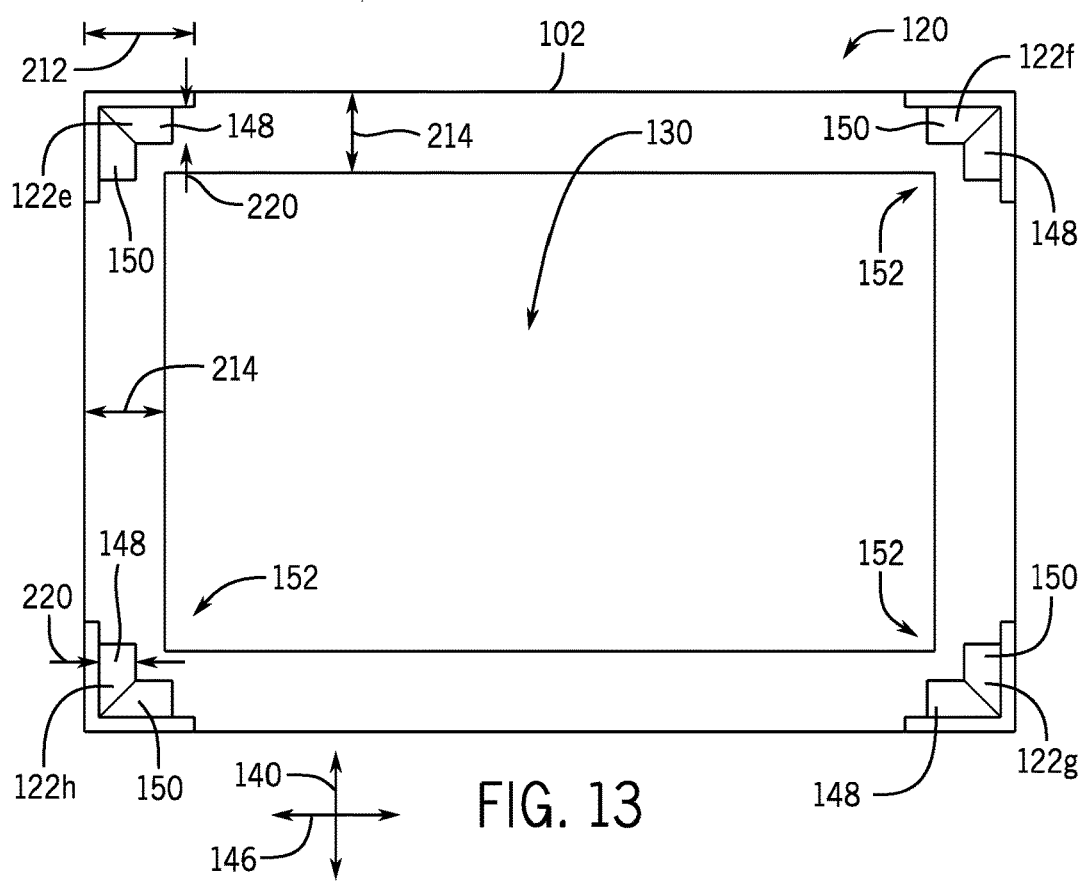
FIG. 13 is a top plan view of an embodiment of box guide assemblies positioned on a top surface of a cradle, according to the present disclosure.

FIG. 13 is a top view of an embodiment of the cradle section 120 having four guide members 122e, 122f, 122g, 122h positioned at each corner of the cradle section 120. In the illustrated embodiment, each guide member 122e, 122f, 122g, 122h includes first and second inclined edges 148, 150 on the legs 152. As a result, each guide member 122e, 122f, 122g, 122h may adjust the orientation of the container 20 along the longitudinal axis 140 and the lateral axis 146. As described above, the first thickness 220 may be smaller than the support member width 214. As a result, the guide members 122e, 122f, 122g, 122h do not interfere with the placement of the container 20 on the top surface 102 of the upper support member 98.

Figure 14:
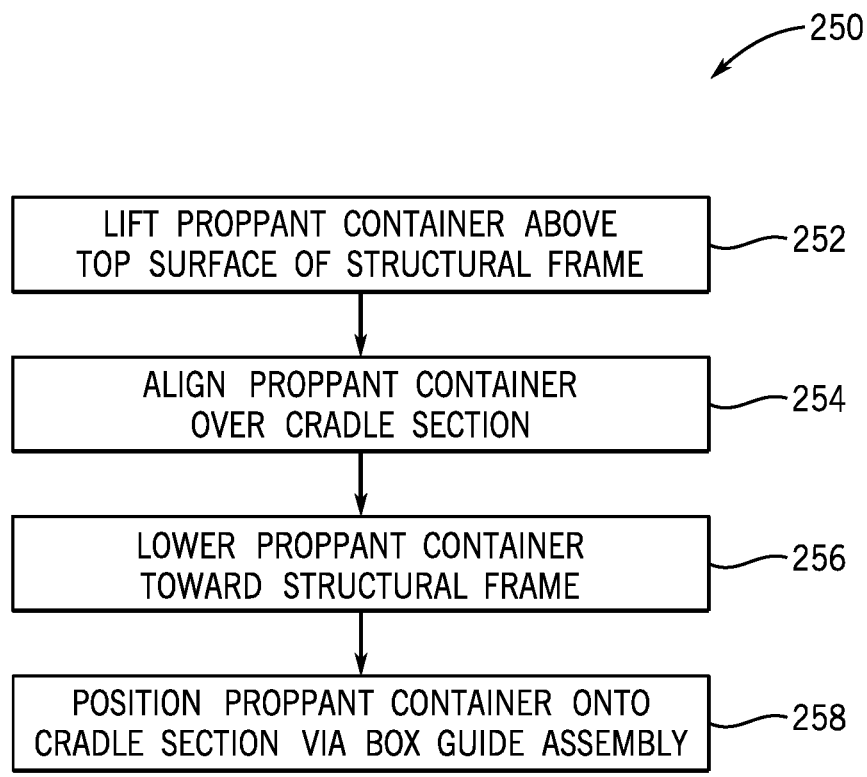
FIG. 14 is a flow chart of an embodiment of a method for positioning a container onto a cradle, according to the present disclosure.

FIG. 14 is a flow chart of a method 250 of positioning the container 20 onto the cradle 80. The proppant container 20 is lifted to a first position above the top surface 102 of the support structure (block 252). For example, the first position is vertically higher (e.g., at a higher elevation), relative to the ground plane, than the top portion 168 of the box guide assembly 104. In other words, the proppant container 20 is lifted over the box guide assemblies 104. Moreover, the container 20 is aligned with the cradle section 120 (block 254). For example, the container 20 may be substantially aligned over the desired location 130. Then, the container 20 may be lowered toward the top surface 102 (block 256). For example, the container 20 may be lowered such that the lower girder 62 of the container 20 is at a vertical position lower than the top portion 168 of the box guide assembly 104. Additionally, the container 20 may be positioned over the desired location 130 via the guide members 122 (block 258). For example, the tapered portion 142 may include an inclined edge 144 which guides the container 20 toward the desired location 130. Accordingly, the container 20 may be misaligned (e.g., not aligned with the desired location 130) during installation and be moved toward the desired location 130 via the guide members 122, thereby improving loading efficiency because the containers 20 may be automatically aligned via the guide members 122 instead of having operators conduct the alignment manually.

Figure 15:
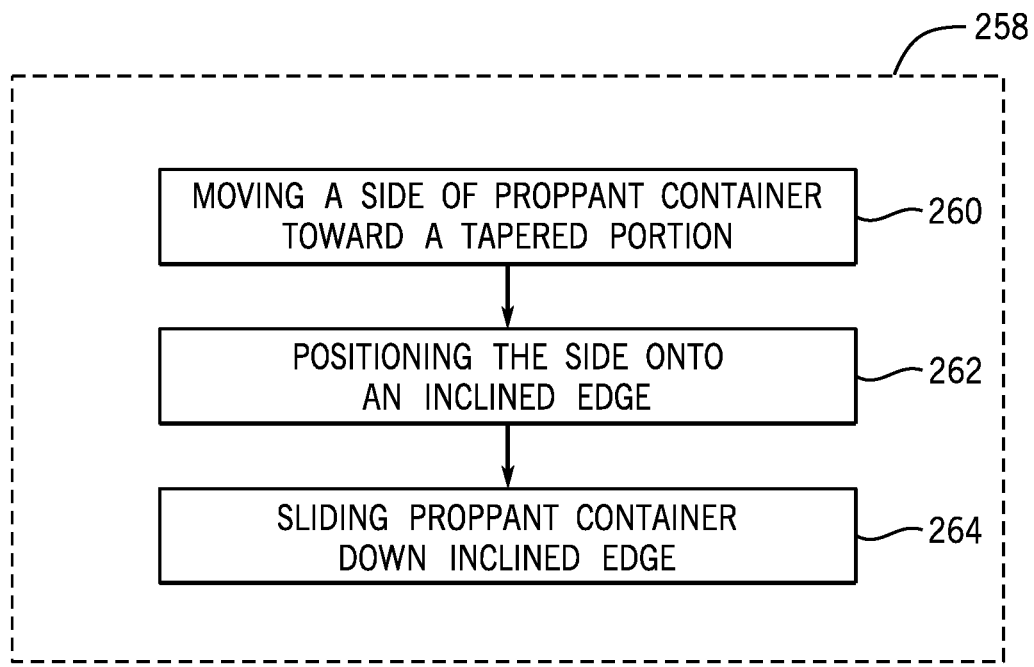
FIG. 15 is a flow chart of an embodiment of a method for positioning a container onto a cradle, according to the present disclosure.
Figure 16:
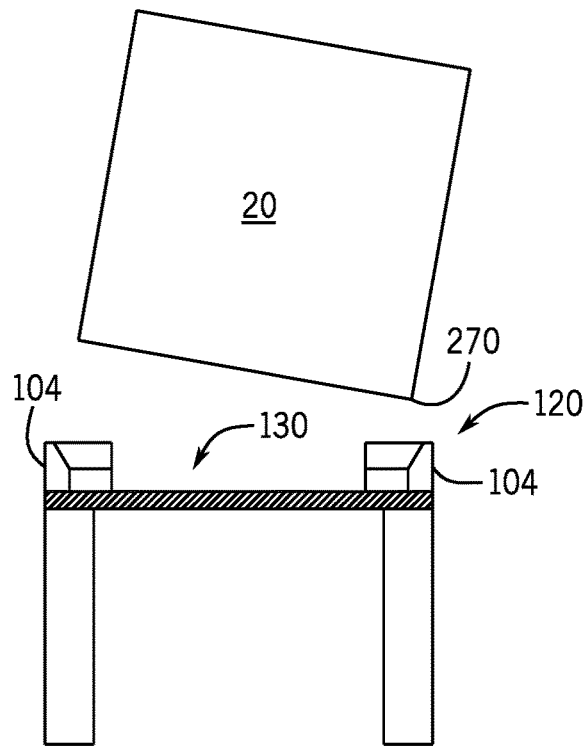
FIG. 16 is a side elevation view of an embodiment of a container positioned over a desired location of a cradle, according to the present disclosure.

FIG. 15 is a flow chart of an embodiment of positioning the container 20 over the desired location 130 via the guide members 122 (block 258) from FIG. 14. A side of the container 20 is moved toward the tapered portion 142 of the guide members 122 (block 260). For example, the forklift 14 may move the container 20 toward the tapered portion 142 such that the container 20 engages the guide member 122.

Moreover, the side of the container 20 is positioned onto the inclined edge 144 of the tapered portion 142 (block 262). For example, the side may be placed into contact with the inclined edge 144. In certain embodiments, the forklift 14 may tilt or lean the container 20 toward the inclined edge 144 such that the side in contact with the inclined edge 144 has a lower elevation (e.g., relative to the ground plane) than the opposite side of the container 20. As a result, the container 20 may move or travel off of the forks 66 of the forklift 14. Then, the container 20 slides down the inclined edge 144 and toward the desired location 130 (block 264). For example, the weight of the container 20 may drive the container 20 to slide down along the length 174 of the inclined edge 144 and toward the desired location 130. Accordingly, by positioning the container 20 into contact with the tapered portion 142, the container 20 may be aligned to move toward the desired location 130 without additional adjustments made by operators.

Figure 17:
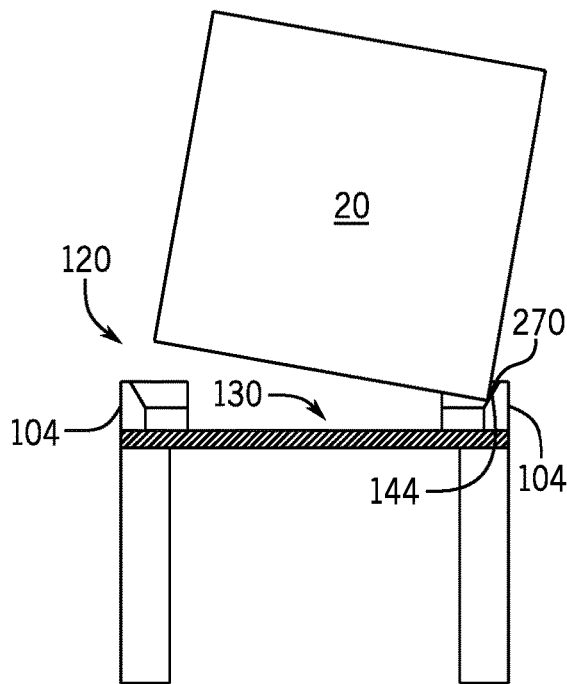
FIG. 17 is a side elevation view of an embodiment of a container in contact with a box guide assembly on a top surface of a cradle, according to the present disclosure.
Figure 18:
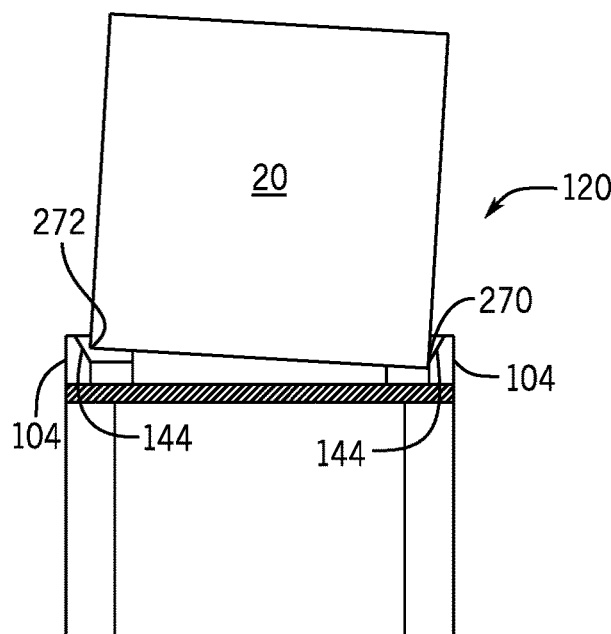
FIG. 18 is a side elevation view of an embodiment of a container in contact with a box guide assembly on a top surface of a cradle, according to the present disclosure.
Figure 19:
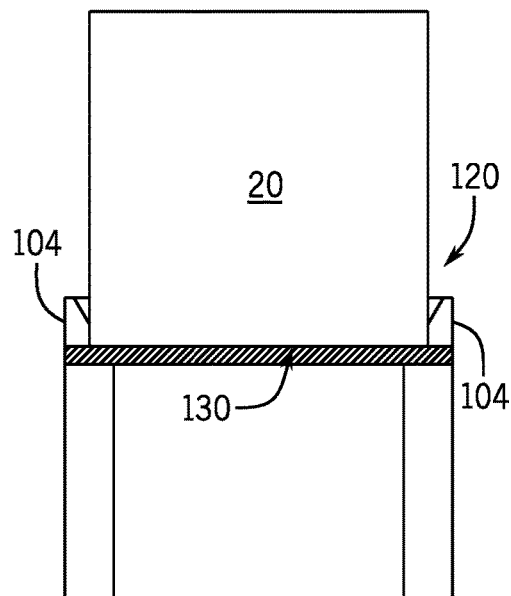
FIG. 19 is a side elevation view of an embodiment of a container on a top surface of a cradle, according to the present disclosure.

FIGS. 16-19 are cross-sectional side views of the container 20 being moved toward the desired location 130 via the box guide assembly 104. For example, with reference to FIG. 16, the container 20 is misaligned with the desired location 130 such that the container 20 contacts the box guide assembly 104 as the container 20 is lowered toward the top surface 102. As shown, a corner portion 270 is positioned above the box guide assembly 104, thereby blocking the container 20 from being lowered to the top surface 102. FIG. 17 depicts the container 20 contacting the box guide assembly 104 as the container 20 is lowered toward the top surface 102. As shown, the corner portion 270 engages the tapered portion 142 of the box guide assembly 104. For example, the corner portion 270 slides down the inclined edge 144 (e.g., due to gravity because of the weight of the container 20) and toward the desired location 130. Continuing to FIG. 18, in the illustrated embodiment, a second corner portion 272 contacts the guide member 122 positioned on the opposite side of the cradle section 120. As shown, the corner portion 270 is positioned vertically below the inclined edge 144 of the guide member 122, but the second corner portion 272 is on the inclined edge 144. However, due to the weight of the container 20, the second corner portion 272 is directed downward and toward the desired location 130. FIG. 19 illustrates the container 20 within the desired location 130. As shown, the box guide assemblies 104 have moved and aligned the container 20 such that the container is positioned on the desired location 130. Accordingly, the installation process may continue without manually repositioning the container 20 in the event the container is misaligned while the container 20 is installed on the cradle 80 via the forklift 14.

FIGS. 20-23 are perspective views of an embodiment of the container 20 being positioned on the cradle section 120. As described above, with respect to FIGS. 15-19, in certain embodiments the container 20 is lifted and aligned over the cradle section 120 to position the container 20 onto the top surface 102. For example, in the illustrated embodiment, the container 20 is moved toward the cradle section 120. As shown, the corner portions 270a, 270b, 270c, 270d are not aligned with the desired location 130 (e.g., are not aligned with the box guide assemblies 104a, 104b, 104c, 104d). As a result, if the operator tried to lower the container 20 onto the top surface 102, the container 20 may not be properly positioned at the desired location 130. Turning to FIG. 21, the container 20 is positioned over the cradle section 120, however, the corner portions 270a, 270b, 270c, 270d are misaligned with the desired location 130. That is, the corner portions 270a, 270b, 270c, 270d are positioned above the box guide assemblies 104 such that if the container 20 were moved downward toward the top surface 102, the corner portions 270a, 270b, 270c, 270d would contact the respective box guide assemblies 104.

FIG. 22 is a perspective view of an embodiment of the container 20 engaging the box guide assemblies 104 because the container 20 is misaligned with the desired location 130 and cannot be positioned on the top surface 102 of the cradle section 120 due to the misalignment. As shown, the corner portions 270a, 270b, 270c, 270d contact the box guide assemblies 104, which in turn drive the container 20 toward the desired location due to the respective inclined edges 144 of the respective tapered portions 142. For example, the inclined edges 144 of the respective box guide assemblies 104 may be arranged such that movement of the container 20 is controlled in at least two directions (e.g., the longitudinal axis 140 and the lateral axis 146). Accordingly, the weight of the container 20 may encourage the container 20 to move toward the desired location 130 (e.g., via gravity because the container 20 is on an inclined surface) such that manual adjustment by an operator is substantially reduced or eliminated. For example, as shown in FIG. 23, the container 20 is positioned at the desired location 130 on the top surface 102 due to the adjustment of the box guide assemblies 104.

Figure 24:
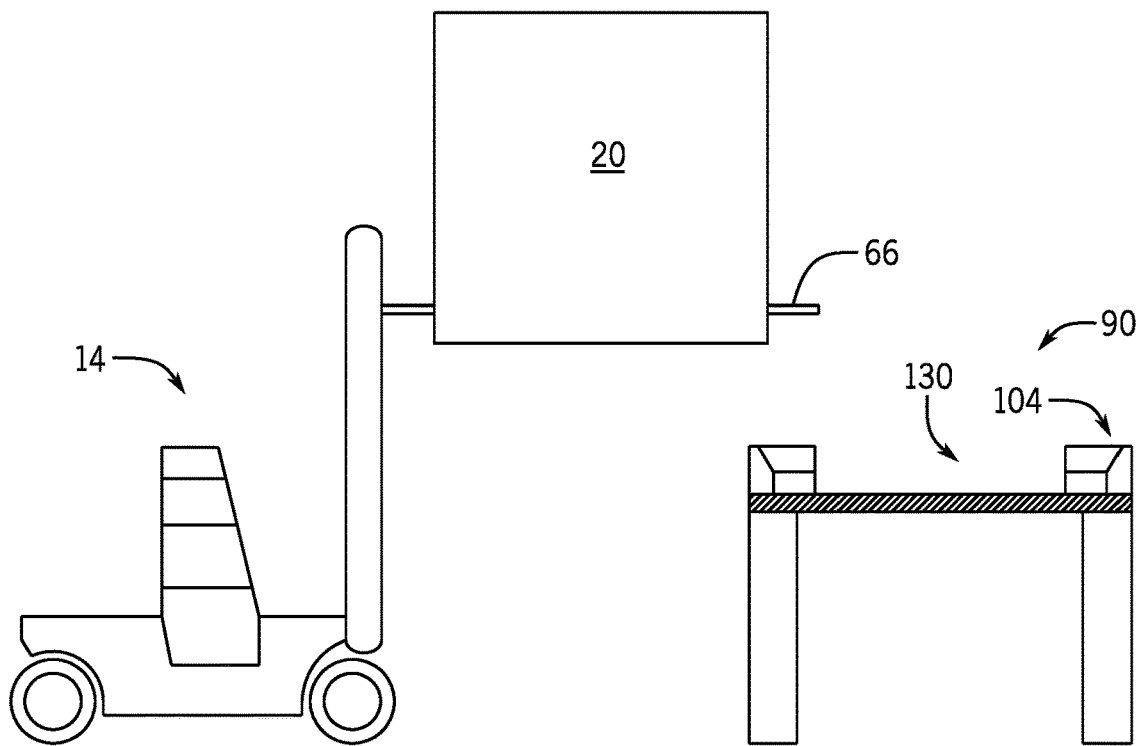
FIG. 24 is a side elevation view of an embodiment of a container positioned over a desired location of a cradle via a forklift, according to the present disclosure.
Figure 25:
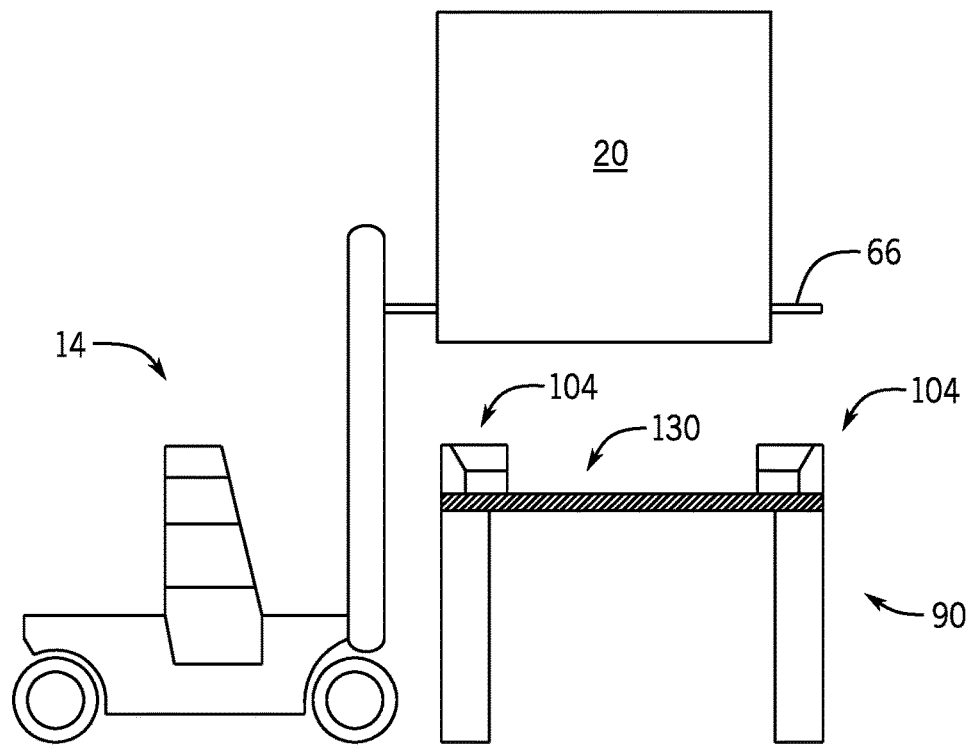
FIG. 25 is a side elevation view of an embodiment of a container in contact with a box guide assembly on a top surface of a cradle via a forklift, according to the present disclosure.
Figure 26:
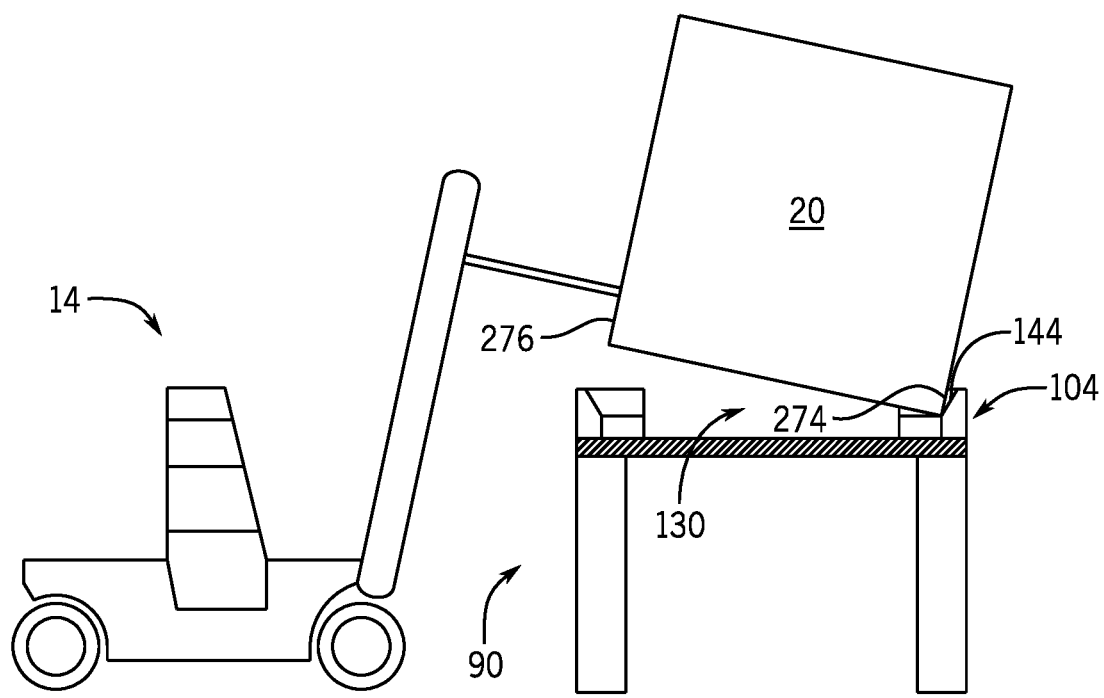
FIG. 26 is a side elevation view of an embodiment of a container in contact with a box guide assembly on a top surface of a cradle via a forklift, according to the present disclosure.
Figure 27:
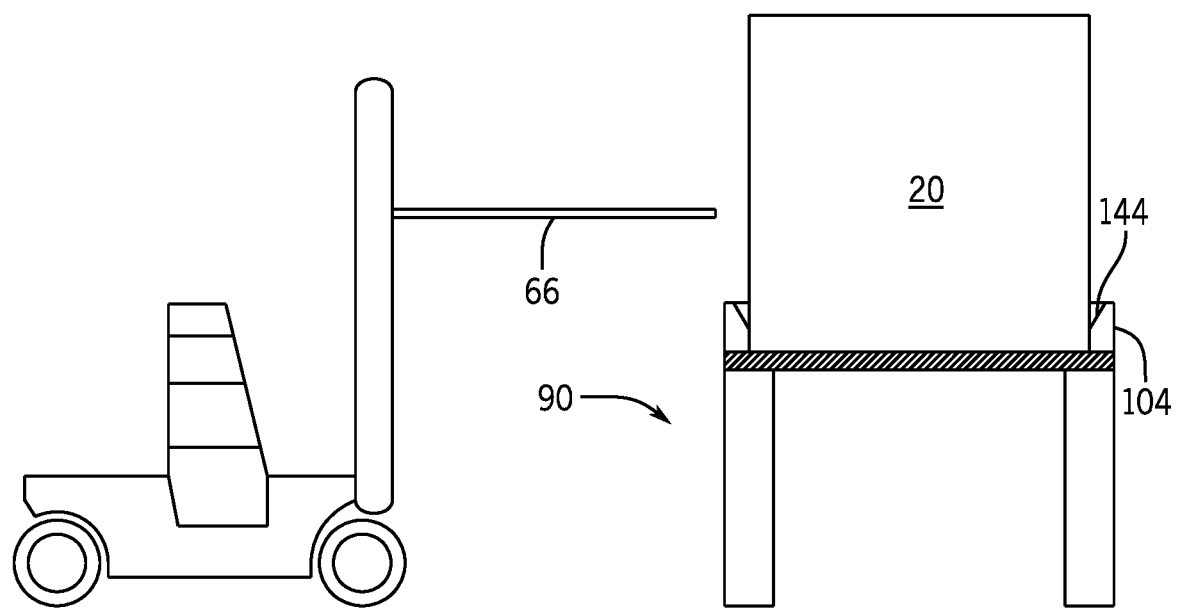
FIG. 27 is a side elevation view of an embodiment of a container on a top surface of a cradle via a forklift, according to the present disclosure.

FIGS. 24-27 are side elevation views of an embodiment of the container 20 being placed onto the structural frame 90 via the forklift 14. Turning to FIG. 24, the forklift 14 moves the container 20 toward the structural frame 90 to position the container 20 onto the top surface 102 of the upper support member 98. As described in detail above, the frame 90 includes the box guide assemblies 104 to align the container 20 with the desired location 130. As shown, the container 20 is lifted to a vertical position having a higher elevation than a top portion of the corner assemblies 124. In other words, the lower girder 62 of the container 20 has a higher elevation than the highest elevation of the frame 90, thereby enabling the container 20 to be positioned over the frame 90. In the embodiment illustrated in FIG. 25, the container 20 is positioned over the frame 90. That is, the container 20 is substantially aligned with the desired location 130 and/or with the corner assemblies 124. In the illustrated embodiment, the container 20 is positioned over the corner assembly 124 such that if the container 20 were lowered toward the frame 90, the container 20 would contact the corner assembly 124. Turning to FIG. 26, the container 20 is tilted and/or slanted toward the corner assembly 124 such that a front edge 274 of the container 20 has a lower elevation, relative to the ground plane, than a back edge 276. Tilting the container 20 via the forklift 14 positions of the front edge 274 onto the inclined edge 144 of the guide member 122, thereby enabling the guide member 122 to substantially align the container 20 with the desired location 130 without additional alignment being done by the operators. For example, the container 20 may slide along the length 174 of the inclined edge 144 via the contact between the front edge 274 and the inclined edge 144. As the container 20 slides down the inclined edge 144, the back edge 276, in certain embodiments, may engage the opposite box guide assembly 104, thereby driving the container 20 toward the desired location 130. Moreover, tilting the container 20 may facilitate removal of the container 20 from the forks 66 of the forklift 14. For example, the container 20 may move away from the forklift 14 via gravity due to the inclined position of the container 20 on the forks 66. As shown in FIG. 27, the container 20 is positioned on the desired location 130. For example, as described above, the container 20 may slide down the inclined edge 144 of the guide member 122 such that the container 20 is positioned onto the desired location 130. In other words, the guide member 122 of the box guide assembly 104 substantially aligns the container 20 with the desired location 130 without utilizing additional or extraneous alignment techniques, such as additional rigging. In this manner, the container 20 may be positioned on the frame 90 quickly and efficiently because the box guide assemblies 104 align the container 20 with the desired location 130.

As described in detail above, embodiments of the present disclosure are directed toward one or more box guide assemblies 104 that guide the containers 20 toward desired locations 130 on the top surface 102 of the cradle 80. In certain embodiments, the box guide assemblies 104 include guide members 122 having the tapered portion 142 at the top portion 168. The tapered portion 142 includes a narrowing width and is sloped downwardly. As the container 20 contacts the inclined edge 144 of the tapered portion 142, the weight of the container 20 causes the container 20 to slide down the inclined edge 144. Accordingly, the container 20 slides away from the box guide assemblies 104 and toward the desired location 130. As described above, the box guide assemblies 104 may be oriented such that the position of the container 20 is adjusted in one or more directions. For example, the tapered edges 144 may be oriented along the longitudinal and/or lateral axes 140, 146 to encourage movement of the container 20 in multiple directions. In this manner, misalignment of the container 20 over the cradle section 120 may be managed without manual adjustments due to the automatic adjustments to the position of the container 20 made by the box guide assemblies 104.

This present application is a continuation which claims priority to and the benefit of U.S. Non-Provisional application Ser. No. 15/426,242, filed Feb. 7, 2017, titled "Cradle for Proppant Container Having Tapered Box Guides," now U.S. Pat. No. 9,840,366, issued Dec. 12, 2017, which is a continuation of U.S. Non-Provisional application Ser. No. 14/986,826, filed Jan. 4, 2016, titled "Cradle for Proppant Container Having Tapered Box Guides," now U.S. Pat. No. 9,624,030, issued Apr. 18, 2017, which is a divisional of U.S. Non-Provisional application Ser. No. 14/848,447, filed Sep. 9, 2015, titled "Cradle for Proppant Container Having Tapered Box Guides," which is related to and claims priority to, and the benefit of U.S. Provisional Application No. 62/050,493, filed Sep. 15, 2014, titled "Cradle for Proppant Container Having Tapered Box Guides." U.S. Non-Provisional application Ser. No. 14/848,447 is also a continuation-in-part of U.S. Non-Provisional application Ser. No. 14/676,039, filed Apr. 1, 2015, titled "Methods and Systems to Transfer Proppant for Fracking with Reduced Risk of Production and Release of Silica Dust at a Well Site," now U.S. Pat. No. 9,340,353, issued May 17, 2016, which claims priority to U.S. Provisional Application No. 62/012,160, filed Jun. 13, 2014, titled "Process and Apparatus for Reducing Silica Exposure During the Delivery of Proppants to a Mine," U.S. Provisional Application No. 62/014,479, filed on Jun. 19, 2014, titled "System and Methods for Reducing Silica Exposure at a Well Site," and U.S. Provisional Application No. 62/114,614, filed Feb. 11, 2015, titled "Methods and Systems to Transfer Proppant for Fracking with Reduced Risk of Production and Release of Silica Dust at a Well Site," each of which are incorporated herein in their entireties by reference. U.S. Non-Provisional application Ser. No. 14/848,447 is also a continuation in part of U.S. Non-Provisional application Ser. No. 13/628,702, filed Sep. 27, 2012 titled "Proppant Discharge System and a Container for Use in Such a Proppant Discharge System," which is a continuation in part of U.S. Non-Provisional application Ser. No. 13/555,635, filed Jul. 23, 2012, titled "Proppant Discharge System Having a Container and the Process for Providing Proppant to a Well Site," now U.S. Pat. No. 9,718,610, issued Aug. 1, 2017, each of which are incorporated herein in their entireties by reference.

The foregoing disclosure and description of the invention is illustrative and explanatory of the embodiments of the invention. Various changes in the details of the illustrated embodiments can be made within the scope of the appended claims without departing from the true spirit of the invention. The embodiments of the present invention should only be limited by the following claims and their legal equivalents.

The invention claimed is:

1. A method of positioning a plurality of proppant containers on a support structure frame, the method comprising:
providing a frame to receive and support the plurality of proppant containers in a side-by-side arrangement, the frame having a top surface to receive and position each of the plurality of proppant containers in an elevated position when having proppant positioned in one or more of the plurality of proppant containers, and a plurality of box guide assemblies connected to the top surface of the frame respectively to guide each of the plurality of proppant containers onto the top surface in the side-by-side arrangement when being loaded thereon in the elevated position, each of the plurality of box guide assemblies positioned to include:
  one or more corner assemblies positioned to extend upwardly from the top surface and positioned along a peripheral edge of the frame to at least partially define a desired location to position the one or more of the plurality of proppant containers, and
  one or more guide members positioned to extend upwardly and adjacent the one or more corner assemblies to guide the one or more of the plurality of proppant containers onto the top surface, each guide member having a tapered portion extending distally from the top surface such that a first width of the tapered portion at a top portion of the guide member is less than a second width of the tapered portion at a bottom portion of the guide member and an inclined edge downwardly sloping from a periphery of the frame toward the desired location and extending between a proximal side of the guide member and a distal side of the guide member;
lifting each of the plurality of proppant containers when loaded with proppant above the elevated position adjacent in the side-by-side arrangement adjacent the top surface of the frame; and
lowering each of the plurality of proppant containers into the elevated position to contact the one or more guide members of one or more of the plurality of box guide assemblies thereby to guide each of the plurality of proppant containers onto the top surface of the frame, wherein the tapered portion contactingly directs each of the plurality of proppant containers to the desired location when the proppant container is being positioned onto the frame.

2. The method as defined in claim 1, wherein the inclined edge further extends from the top portion of the one or more guide members to a first end of the bottom portion of the one or more guide members, the inclined edge extending laterally away from the proximal side, and each of the one or more guide members being bound by the periphery of the frame.

3. A method for positioning a proppant container in a desired location on a support structure, the method comprising:
lifting a proppant container having an interior volume at least partially filled with proppant above a frame having a top surface with a plurality of cradle sections configured in a side-by-side arrangement;
aligning the proppant container over a target cradle section selected from the plurality of cradle sections, each of the plurality of cradle sections including a guide assembly having a corner member positioned along a peripheral edge of the frame and extending upwardly from the top surface, and a guide member extending upwardly from the top surface and having a tapered portion with a first side positioned adjacent a corner assembly, a second side positioned adjacent the desired location and an inclined edge extending between the first side and the second side, wherein a length of the first side is greater that a length of the second side such that the guide member forms a downwardly sloping face from the peripheral edge to the desired location;
lowering the proppant container at the target cradle section such that the proppant container engages the guide assembly; and
positioning the proppant container to contact the tapered portion and guide the proppant container into an elevated position on the frame at the desired location.

4. The method according to claim 3, wherein positioning the proppant container comprises:
moving a side of the proppant container into contact with the tapered portion;
guiding the side of the proppant container along the downwardly sloping face; and
sliding the proppant container into the elevated position.

5. The method according to claim 3, wherein the guide assembly includes:
a first guide assembly having a first corner member positioned along a first peripheral edge of the frame and extending upwardly from the top surface, and a first guide member extending upwardly from the top surface and having a first tapered portion with a first side positioned adjacent the first corner assembly, a second side positioned adjacent the desired location and an first inclined edge extending between the first side and the second side, wherein a length of the first side is greater that a length of the second side such that the first guide member forms a first downwardly sloping face from the first peripheral edge to the desired location;
a second guide assembly having a second corner member positioned along a second peripheral edge of the frame opposite the first peripheral edge and extending upwardly from the top surface, and a second guide member extending upwardly from the top surface and having a second tapered portion with a third side positioned adjacent the second corner assembly, a fourth side positioned adjacent the desired location and a second inclined edge extending between the third side and the fourth side, wherein a length of the third side is greater that a length of the fourth side such that the second guide member forms a second downwardly sloping face from the second peripheral edge to the desired location;
the method further comprising lowering the proppant container at the target cradle section such that the proppant container engages the first and second guide assemblies; and
positioning the proppant container to contact at least one of the first and second tapered portions and guide the proppant container into the elevated position on the frame at the desired location.

6. The method according to claim 5, wherein positioning the proppant container comprises:
moving a first side of the proppant container into contact with at least one of the first and second tapered portions;
guiding the first side of the proppant container along at least one of first and second downwardly sloping faces; and
sliding the proppant container into the elevated position.

7. The method according to claim 4, wherein the guide assembly includes:
a third guide assembly positioned in spaced relation to the first guide assembly along the first peripheral edge and having a third corner member positioned along the first peripheral edge and extending upwardly from the top surface, and a third guide member extending upwardly from the top surface and having a third tapered portion with a fifth side positioned adjacent the third corner assembly, a sixth side positioned adjacent the desired location and an third inclined edge extending between the fifth side and the sixth side, wherein a length of the fifth side is greater that a length of the sixth side such that the third guide member forms a third downwardly sloping face from the first peripheral edge to the desired location;
a fourth guide member positioned in spaced relation to the second guide assembly along the second peripheral edge and having a fourth corner member positioned along a second peripheral edge of the frame and extending upwardly from the top surface, and a fourth guide member extending upwardly from the top surface and having a fourth tapered portion with a seventh side positioned adjacent the fourth corner assembly, an eighth side positioned adjacent the desired location and a fourth inclined edge extending between the seventh side and the eighth side, wherein a length of the seventh side is greater that a length of the eighth side such that the fourth guide member forms a fourth downwardly sloping face from the second peripheral edge to the desired location;
the method further comprising lowering the proppant container at the target cradle section such that the proppant container engages the guide assembly; and
positioning the proppant container to contact at least one of the first, second, third and fourth tapered portions and guide the proppant container into the elevated position on the frame at the desired location.

8. The method according to claim 7, wherein positioning the proppant container comprises:
moving a side of the proppant container into contact with at least one of the first, second, third and fourth tapered portions;
guiding the side of the proppant container along at least one of the first, second, third and fourth downwardly sloping faces; and
sliding the proppant container into the elevated position.

9. The method of claim 8 further comprising:
positioning the proppant container to initially contact the first and third tapered portions and locate the proppant container relative to the first peripheral edge; then
positioning the proppant container to subsequently contact the second and fourth tapered portions and guide the proppant container into the elevated position on the frame at the desired location.

10. The method according to claim 8, wherein positioning the proppant container comprises:
   moving a first side of the proppant container into contact with at least one of the first and third tapered portions;
   guiding the first side of the proppant container along at least one of the first and third downwardly sloping faces;
   moving a second side of the proppant container into contact with at least one of the second and fourth tapered portions;
   guiding the second side of the proppant container along at least one of the second and fourth downwardly sloping faces; and
   sliding the proppant container into the elevated position.

\* \* \* \* \*